US012784127B2

(12) United States Patent
Durbhakula et al.

(10) Patent No.: US 12,784,127 B2
(45) Date of Patent: Nov. 3, 2026

(54) MEMORY AWARE REGISTER ALLOCATOR FOR GRAPHICS PROCESSING UNITS

(71) Applicant: QUALCOMM Incorporated, San Diego, CA (US)

(72) Inventors: Suryanarayana Murthy Durbhakula, Hyderabad (IN); Venkatesh K R, Vijayawada (IN)

(73) Assignee: QUALCOMM Incorporated, San Diego, CA (US)

( * ) Notice: Subject to any disclaimer, the term of this patent is extended or adjusted under 35 U.S.C. 154(b) by 214 days.

(21) Appl. No.: 18/596,506

(22) Filed: Mar. 5, 2024

(65) Prior Publication Data

US 2025/0285208 A1 Sep. 11, 2025

(51) Int. Cl.
*G06T 1/60* (2006.01)
*G06F 12/0897* (2016.01)

(52) U.S. Cl.
CPC ............ *G06T 1/60* (2013.01); *G06F 12/0897* (2013.01)

(58) Field of Classification Search
CPC ..... G06T 1/60; G06T 15/005; G06F 12/0897; G06F 2212/455; G06F 3/0604; G06F 12/0811
See application file for complete search history.

(56) References Cited

U.S. PATENT DOCUMENTS

| | | | | |
|---|---|---|---|---|
| 11,188,315 | B1 * | 11/2021 | Luo | G06F 8/4441 |
| 2011/0078381 | A1 * | 3/2011 | Heinrich | G06F 12/0897 711/E12.024 |
| 2020/0111454 | A1 * | 4/2020 | Ray | G09G 5/001 |
| 2025/0238278 | A1 * | 7/2025 | Kong | G06F 9/5055 |

* cited by examiner

*Primary Examiner* — Kent W Chang
*Assistant Examiner* — Matthew Clothier
(74) *Attorney, Agent, or Firm* — Procopiio, Cory, Hargreaves & Savitch LLP

(57) ABSTRACT

Aspects presented herein relate to methods and devices for graphics processing units including an apparatus. The apparatus may load a set of values from a plurality of memories to a set of registers, where the plurality of memories includes at least one first memory and at least one second memory. Further, the apparatus may determine whether (1) a storage level for the at least one second memory is less than a maximum storage level, or (2) at least one first value in the set of values is selected for a register spill operation and will be utilized for an instruction that is after an instruction threshold. The apparatus may also store (1) the at least one first value in the at least one second memory or (2) at least one second value in the set of values in the at least one second memory.

19 Claims, 12 Drawing Sheets

MEMORY AWARE REGISTER ALLOCATOR FOR GRAPHICS PROCESSING UNITS

TECHNICAL FIELD

The present disclosure relates generally to processing systems and, more particularly, to one or more techniques for graphics processing.

INTRODUCTION

Computing devices often perform graphics and/or display processing (e.g., utilizing a graphics processing unit (GPU), a central processing unit (CPU), a display processor, etc.) to render and display visual content. Such computing devices may include, for example, computer workstations, mobile phones such as smartphones, embedded systems, personal computers, tablet computers, and video game consoles. GPUs are configured to execute a graphics processing pipeline that includes one or more processing stages, which operate together to execute graphics processing commands and output a frame. A central processing unit (CPU) may control the operation of the GPU by issuing one or more graphics processing commands to the GPU. Modern day CPUs are typically capable of executing multiple applications concurrently, each of which may need to utilize the GPU during execution. A display processor is configured to convert digital information received from a CPU to analog values and may issue commands to a display panel for displaying the visual content. A device that provides content for visual presentation on a display may utilize a GPU and/or a display processor.

A GPU of a device may be configured to perform the processes in a graphics processing pipeline. Further, a display processor or display processing unit (DPU) may be configured to perform the processes of display processing. However, with the advent of wireless communication and smaller, handheld devices, there has developed an increased need for improved graphics processing.

BRIEF SUMMARY

The following presents a simplified summary of one or more aspects in order to provide a basic understanding of such aspects. This summary is not an extensive overview of all contemplated aspects, and is intended to neither identify key or critical elements of all aspects nor delineate the scope of any or all aspects. Its sole purpose is to present some concepts of one or more aspects in a simplified form as a prelude to the more detailed description that is presented later.

In an aspect of the disclosure, a method, a computer-readable medium, and an apparatus are provided. The apparatus may be a graphics processing unit (GPU), a central processing unit (CPU), or any apparatus that may perform graphics processing. The apparatus may obtain an indication of a set of values in a plurality of memories, where a load of the set of values from the plurality of memories to a set of registers is based on the obtainment of the indication of the set of values in the plurality of memories. Additionally, the apparatus may load a set of values from a plurality of memories to a set of registers, where the plurality of memories includes at least one first memory and at least one second memory, where each of the set of values is associated with the at least one first memory or the at least one second memory. The apparatus may also perform at least one computation for the set of values in the set of registers, where the at least one computation includes at least one of: an arithmetic operation, a comparison operation, a logical operation, and where the determination is based on the performance of the at least one computation. Moreover, the apparatus may determine whether (1) a storage level for the at least one second memory is less than a maximum storage level, or (2) at least one first value in the set of values is selected for a register spill operation and will be utilized for an instruction that is after an instruction threshold, where the at least one first value is associated with the at least one first memory. The apparatus may also identify that the at least one second value corresponds to a second instruction that is after instructions for all other second values in the at least one second memory. The apparatus may also store (1) the at least one first value in the at least one second memory based on the storage level for the at least one second memory being less than the maximum storage level, or (2) at least one second value in the set of values in the at least one second memory based on the at least one first value being selected for the register spill operation and being utilized for the instruction that is after the instruction threshold, where the at least one second value is associated with the at least one second memory. The apparatus may also refrain from storing, based on the storage level for the at least one second memory being less than the maximum storage level, the at least one first value in the at least one first memory. The apparatus may also refrain from storing, based on the at least one first value being selected for the register spill operation and being utilized for the instruction that is after the instruction threshold, the at least one first value in the at least one second memory. The apparatus may also output an indication of the storage of (1) the at least one first value in the at least one second memory or (2) the at least one second value in the at least one second memory.

The details of one or more examples of the disclosure are set forth in the accompanying drawings and the description below. Other features, objects, and advantages of the disclosure will be apparent from the description and drawings, and from the claims.

DETAILED DESCRIPTION

Figure 1:
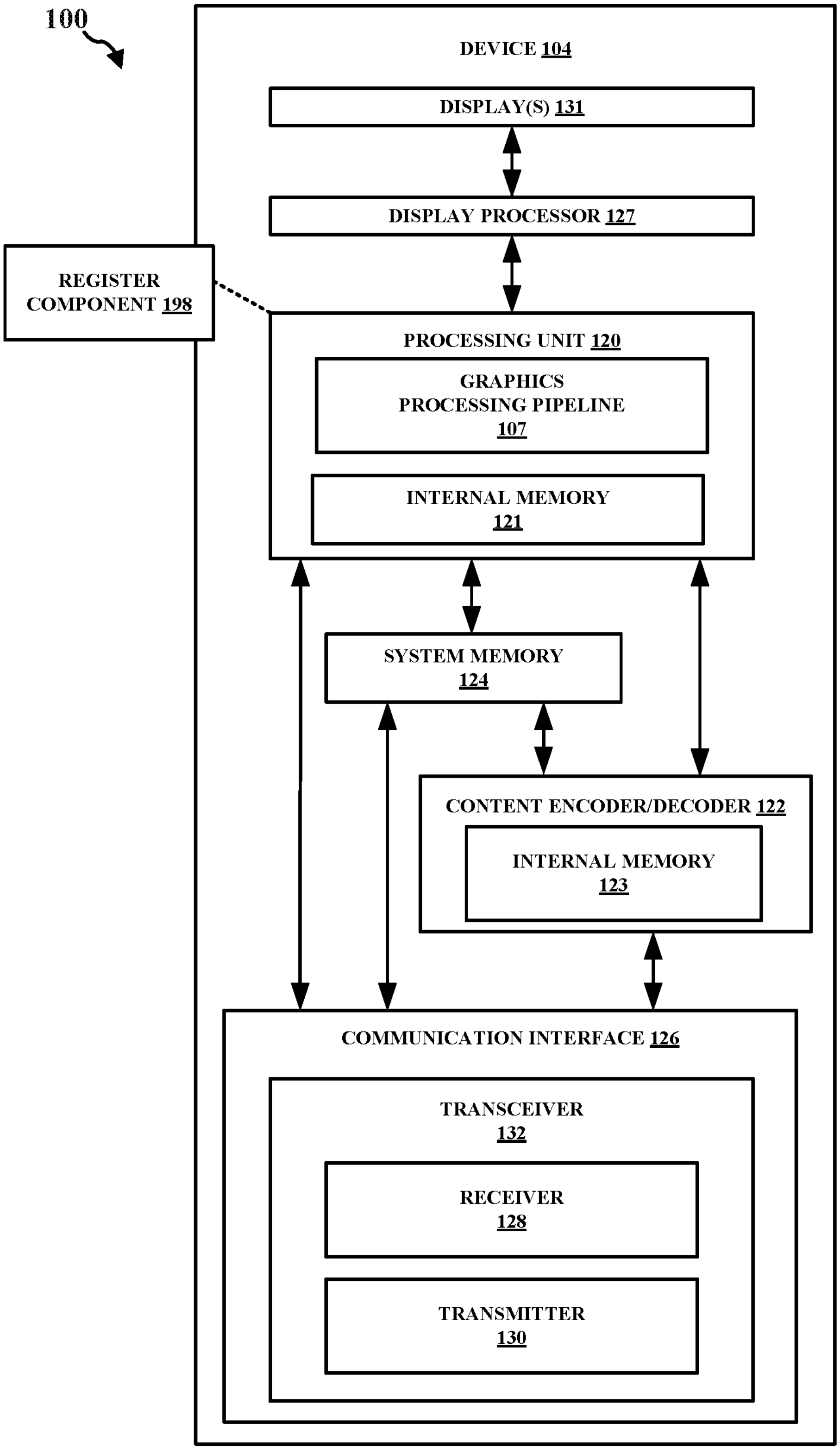
FIG. 1 is a block diagram that illustrates an example content generation system.

There are a fixed number of registers in GPUs and there may need to be support for a number of active waves. Each wave, depending on the shader, can consume a lot of registers. When the registers do not include enough space, the values may be spilled to memory. These values reside in the caches waiting to be accessed again. However, it is possible that before they are accessed again the lines can get replaced from smaller top level caches and those values may need to be obtained from larger higher latency caches. On the other hand, there may be a small constant latency for fast access local memory in GPUs. As indicated herein, GPUs may be limited by the number of available registers (e.g., context registers). For example, the performance of a GPU may be limited by the number of available registers. In some instances, when data or a value (e.g., a pixel value or a shading value) is not immediately needed, that data may be moved to a local memory or a cache. The data is moved in order to free up space in the registers (e.g., context registers), as space is limited in the registers. As an increasing amount of data/values are moved, the data/values may be moved from local memory/cache to global memory or dynamic random access memory (DRAM). If this data/value is needed, it may take a long time to retrieve it. This data/value movement to global memory or DRAM may take a long time and/or utilize a high amount of processing power at a GPU, which in turn slows down GPU performance. Aspects of the present disclosure may select which data/values are to be moved to certain types of memory.

Aspects of the present disclosure may include a number of benefits or advantages. For instance, aspects presented herein may improve the performance (e.g., shader performance) at GPUs. In order to do so, aspects of the present disclosure may select which data/values are to be moved to global memory and which data/values should stay in local memory. For instance, aspects presented herein may utilize a compiler at a GPU (e.g., a register allocator in a compiler) to select which data/values are to be moved to global memory and which data/values should stay in local memory. By doing so, aspects presented herein may increase the likelihood that data/values will not need to be retrieved from global memory, which takes much longer and slows down GPU performance. In turn, this will improve GPU performance. That is, aspects presented herein may move data/values to different types of memory (e.g., global memory or local memory) by considering the memory home of the data/values. This will decrease the amount of latency when retrieving the data/values at a later time.

Various aspects of systems, apparatuses, computer program products, and methods are described more fully hereinafter with reference to the accompanying drawings. This disclosure may, however, be embodied in many different forms and should not be construed as limited to any specific structure or function presented throughout this disclosure. Rather, these aspects are provided so that this disclosure will be thorough and complete, and will fully convey the scope of this disclosure to those skilled in the art. Based on the teachings herein one skilled in the art should appreciate that the scope of this disclosure is intended to cover any aspect of the systems, apparatuses, computer program products, and methods disclosed herein, whether implemented independently of, or combined with, other aspects of the disclosure. For example, an apparatus may be implemented or a method may be practiced using any number of the aspects set forth herein. In addition, the scope of the disclosure is intended to cover such an apparatus or method which is practiced using other structure, functionality, or structure and functionality in addition to or other than the various aspects of the disclosure set forth herein. Any aspect disclosed herein may be embodied by one or more elements of a claim.

Although various aspects are described herein, many variations and permutations of these aspects fall within the scope of this disclosure. Although some potential benefits and advantages of aspects of this disclosure are mentioned, the scope of this disclosure is not intended to be limited to particular benefits, uses, or objectives. Rather, aspects of this disclosure are intended to be broadly applicable to different wireless technologies, system configurations, networks, and transmission protocols, some of which are illustrated by way of example in the figures and in the following description. The detailed description and drawings are merely illustrative of this disclosure rather than limiting, the scope of this disclosure being defined by the appended claims and equivalents thereof.

Several aspects are presented with reference to various apparatus and methods. These apparatus and methods are described in the following detailed description and illustrated in the accompanying drawings by various blocks, components, circuits, processes, algorithms, and the like (collectively referred to as "elements"). These elements may be implemented using electronic hardware, computer software, or any combination thereof. Whether such elements are implemented as hardware or software depends upon the particular application and design constraints imposed on the overall system.

By way of example, an element, or any portion of an element, or any combination of elements may be implemented as a "processing system" that includes one or more processors (which may also be referred to as processing units). Examples of processors include microprocessors, microcontrollers, graphics processing units (GPUs), general purpose GPUs (GPGPUs), central processing units (CPUs), application processors, digital signal processors (DSPs), reduced instruction set computing (RISC) processors, systems-on-chip (SOC), baseband processors, application specific integrated circuits (ASICs), field programmable gate arrays (FPGAs), programmable logic devices (PLDs), state machines, gated logic, discrete hardware circuits, and other suitable hardware configured to perform the various functionality described throughout this disclosure. One or more processors in the processing system may execute software. Software may be construed broadly to mean instructions, instruction sets, code, code segments, program code, programs, subprograms, software components, applications, software applications, software packages, routines, subroutines, objects, executables, threads of execution, procedures, functions, etc., whether referred to as software, firmware, middleware, microcode, hardware description language, or otherwise. The term application may refer to software. As described herein, one or more techniques may refer to an application, i.e., software, being configured to perform one or more functions. In such examples, the application may be stored on a memory, e.g., on-chip memory of a processor, system memory, or any other memory. Hardware described herein, such as a processor may be configured to execute the application. For example, the application may be described as including code that, when executed by the hardware, causes the hardware to perform one or more techniques described herein. As an example, the hardware may access the code from a memory and execute the code accessed from the memory to perform one or more techniques described herein. In some examples, components are identified in this disclosure. In such examples, the components may be hardware, software, or a combination thereof. The components may be separate components or sub-components of a single component.

Accordingly, in one or more examples described herein, the functions described may be implemented in hardware, software, or any combination thereof. If implemented in software, the functions may be stored on or encoded as one or more instructions or code on a computer-readable medium. Computer-readable media includes computer storage media. Storage media may be any available media that may be accessed by a computer. By way of example, and not limitation, such computer-readable media may comprise a random access memory (RAM), a read-only memory (ROM), an electrically erasable programmable ROM (EEPROM), optical disk storage, magnetic disk storage, other magnetic storage devices, combinations of the aforementioned types of computer-readable media, or any other medium that may be used to store computer executable code in the form of instructions or data structures that may be accessed by a computer.

In general, this disclosure describes techniques for having a graphics processing pipeline in a single device or multiple devices, improving the rendering of graphical content, and/or reducing the load of a processing unit, i.e., any processing unit configured to perform one or more techniques described herein, such as a GPU. For example, this disclosure describes techniques for graphics processing in any device that utilizes graphics processing. Other example benefits are described throughout this disclosure.

As used herein, instances of the term "content" may refer to "graphical content," "image," and vice versa. This is true regardless of whether the terms are being used as an adjective, noun, or other parts of speech. In some examples, as used herein, the term "graphical content" may refer to a content produced by one or more processes of a graphics processing pipeline. In some examples, as used herein, the term "graphical content" may refer to a content produced by a processing unit configured to perform graphics processing. In some examples, as used herein, the term "graphical content" may refer to a content produced by a graphics processing unit.

In some examples, as used herein, the term "display content" may refer to content generated by a processing unit configured to perform displaying processing. In some examples, as used herein, the term "display content" may refer to content generated by a display processing unit. Graphical content may be processed to become display content. For example, a graphics processing unit may output graphical content, such as a frame, to a buffer (which may be referred to as a framebuffer). A display processing unit may read the graphical content, such as one or more frames from the buffer, and perform one or more display processing techniques thereon to generate display content. For example, a display processing unit may be configured to perform composition on one or more rendered layers to generate a frame. As another example, a display processing unit may be configured to compose, blend, or otherwise combine two or more layers together into a single frame. A display processing unit may be configured to perform scaling, e.g., upscaling or downscaling, on a frame. In some examples, a frame may refer to a layer. In other examples, a frame may refer to two or more layers that have already been blended together to form the frame, i.e., the frame includes two or more layers, and the frame that includes two or more layers may subsequently be blended.

FIG. 1 is a block diagram that illustrates an example content generation system 100 configured to implement one or more techniques of this disclosure. The content generation system 100 includes a device 104. The device 104 may include one or more components or circuits for performing various functions described herein. In some examples, one or more components of the device 104 may be components of an SOC. The device 104 may include one or more components configured to perform one or more techniques of this disclosure. In the example shown, the device 104 may include a processing unit 120, a content encoder/decoder 122, and a system memory 124. In some aspects, the device 104 may include a number of components, e.g., a communication interface 126, a transceiver 132, a receiver 128, a transmitter 130, a display processor 127, and one or more displays 131. Reference to the display 131 may refer to the one or more displays 131. For example, the display 131 may include a single display or multiple displays. The display 131 may include a first display and a second display. The first display may be a left-eye display and the second display may be a right-eye display. In some examples, the first and second display may receive different frames for presentment thereon. In other examples, the first and second display may receive the same frames for presentment thereon. In further examples, the results of the graphics processing may not be displayed on the device, e.g., the first and second display may not receive any frames for presentment thereon. Instead, the frames or graphics processing results may be transferred to another device. In some aspects, this may be referred to as split-rendering.

The processing unit 120 may include an internal memory 121. The processing unit 120 may be configured to perform graphics processing, such as in a graphics processing pipeline 107. The content encoder/decoder 122 may include an internal memory 123. In some examples, the device 104 may include a display processor, such as the display processor 127, to perform one or more display processing techniques on one or more frames generated by the processing unit 120 before presentment by the one or more displays 131. The display processor 127 may be configured to perform display processing. For example, the display processor 127 may be configured to perform one or more display processing techniques on one or more frames generated by the processing unit 120. The one or more displays 131 may be configured to display or otherwise present frames processed by the display processor 127. In some examples, the one or more displays 131 may include one or more of: a liquid crystal display (LCD), a plasma display, an organic light emitting diode (OLED) display, a projection display device, an augmented reality display device, a virtual reality display device, a head-mounted display, or any other type of display device.

Memory external to the processing unit 120 and the content encoder/decoder 122, such as system memory 124, may be accessible to the processing unit 120 and the content encoder/decoder 122. For example, the processing unit 120 and the content encoder/decoder 122 may be configured to read from and/or write to external memory, such as the system memory 124. The processing unit 120 and the content encoder/decoder 122 may be communicatively coupled to the system memory 124 over a bus. In some examples, the processing unit 120 and the content encoder/decoder 122 may be communicatively coupled to each other over the bus or a different connection.

The content encoder/decoder 122 may be configured to receive graphical content from any source, such as the system memory 124 and/or the communication interface 126. The system memory 124 may be configured to store received encoded or decoded graphical content. The content encoder/decoder 122 may be configured to receive encoded or decoded graphical content, e.g., from the system memory 124 and/or the communication interface 126, in the form of encoded pixel data. The content encoder/decoder 122 may be configured to encode or decode any graphical content.

The internal memory 121 or the system memory 124 may include one or more volatile or non-volatile memories or storage devices. In some examples, internal memory 121 or the system memory 124 may include RAM, SRAM, DRAM, erasable programmable ROM (EPROM), electrically erasable programmable ROM (EEPROM), flash memory, a magnetic data media or an optical storage media, or any other type of memory.

The internal memory 121 or the system memory 124 may be a non-transitory storage medium according to some examples. The term "non-transitory" may indicate that the storage medium is not embodied in a carrier wave or a propagated signal. However, the term "non-transitory" should not be interpreted to mean that internal memory 121 or the system memory 124 is non-movable or that its contents are static. As one example, the system memory 124 may be removed from the device 104 and moved to another device. As another example, the system memory 124 may not be removable from the device 104.

The processing unit 120 may be a central processing unit (CPU), a graphics processing unit (GPU), a general purpose GPU (GPGPU), or any other processing unit that may be configured to perform graphics processing. In some examples, the processing unit 120 may be integrated into a motherboard of the device 104. In some examples, the processing unit 120 may be present on a graphics card that is installed in a port in a motherboard of the device 104, or may be otherwise incorporated within a peripheral device configured to interoperate with the device 104. The processing unit 120 may include one or more processors, such as one or more microprocessors, GPUs, application specific integrated circuits (ASICs), field programmable gate arrays (FPGAs), arithmetic logic units (ALUs), digital signal processors (DSPs), discrete logic, software, hardware, firmware, other equivalent integrated or discrete logic circuitry, or any combinations thereof. If the techniques are implemented partially in software, the processing unit 120 may store instructions for the software in a suitable, non-transitory computer-readable storage medium, e.g., internal memory 121, and may execute the instructions in hardware using one or more processors to perform the techniques of this disclosure. Any of the foregoing, including hardware, software, a combination of hardware and software, etc., may be considered to be one or more processors.

The content encoder/decoder 122 may be any processing unit configured to perform content decoding. In some examples, the content encoder/decoder 122 may be integrated into a motherboard of the device 104. The content encoder/decoder 122 may include one or more processors, such as one or more microprocessors, application specific integrated circuits (ASICs), field programmable gate arrays (FPGAs), arithmetic logic units (ALUs), digital signal processors (DSPs), video processors, discrete logic, software, hardware, firmware, other equivalent integrated or discrete logic circuitry, or any combinations thereof. If the techniques are implemented partially in software, the content encoder/decoder 122 may store instructions for the software in a suitable, non-transitory computer-readable storage medium, e.g., internal memory 123, and may execute the instructions in hardware using one or more processors to perform the techniques of this disclosure. Any of the foregoing, including hardware, software, a combination of hardware and software, etc., may be considered to be one or more processors.

In some aspects, the content generation system 100 may include a communication interface 126. The communication interface 126 may include a receiver 128 and a transmitter 130. The receiver 128 may be configured to perform any receiving function described herein with respect to the device 104. Additionally, the receiver 128 may be configured to receive information, e.g., eye or head position information, rendering commands, or location information, from another device. The transmitter 130 may be configured to perform any transmitting function described herein with respect to the device 104. For example, the transmitter 130 may be configured to transmit information to another device, which may include a request for content. The receiver 128 and the transmitter 130 may be combined into a transceiver 132. In such examples, the transceiver 132 may be configured to perform any receiving function and/or transmitting function described herein with respect to the device 104.

Referring again to FIG. 1, in certain aspects, the processing unit 120 may include a register component 198 configured to obtain an indication of a set of values in a plurality of memories, where a load of the set of values from the plurality of memories to a set of registers is based on the obtainment of the indication of the set of values in the plurality of memories. The register component 198 may also be configured to load a set of values from a plurality of memories to a set of registers, where the plurality of memories includes at least one first memory and at least one second memory, where each of the set of values is associated with the at least one first memory or the at least one second memory. The register component 198 may also be configured to perform at least one computation for the set of values in the set of registers, where the at least one computation includes at least one of: an arithmetic operation, a comparison operation, a logical operation, and where the determination is based on the performance of the at least one computation. The register component 198 may also be configured to determine whether (1) a storage level for the at least one second memory is less than a maximum storage level, or (2) at least one first value in the set of values is selected for a register spill operation and will be utilized for an instruction that is after an instruction threshold, where the at least one first value is associated with the at least one first memory. The register component 198 may also be configured to identify that the at least one second value corresponds to a second instruction that is after instructions for all other second values in the at least one second memory. The register component 198 may also be configured to store (1) the at least one first value in the at least one second memory based on the storage level for the at least one second memory being less than the maximum storage level, or (2) at least one second value in the set of values in the at least one second memory based on the at least one first value being selected for the register spill operation and being utilized for the instruction that is after the instruction threshold, where the at least one second value is associated with the at least one second memory. The register component 198 may also be configured to refrain from storing, based on the storage level for the at least one second memory being less than the maximum storage level, the at least one first value in the at least one first memory. The register component 198 may also be configured to refrain from storing, based on the at least one first value being selected for the register spill operation and being utilized for the instruction that is after the instruction threshold, the at least one first value in the at least one second memory. The register component 198 may also be configured to output an indication of the storage of (1) the at least one first value in the at least one second memory or (2) the at least one second value in the at least one second memory. Although the following description may be focused on graphics processing, the concepts described herein may be applicable to other similar processing techniques.

As described herein, a device, such as the device 104, may refer to any device, apparatus, or system configured to perform one or more techniques described herein. For example, a device may be a server, a base station, user equipment, a client device, a station, an access point, a computer, e.g., a personal computer, a desktop computer, a laptop computer, a tablet computer, a computer workstation, or a mainframe computer, an end product, an apparatus, a phone, a smart phone, a server, a video game platform or console, a handheld device, e.g., a portable video game device or a personal digital assistant (PDA), a wearable computing device, e.g., a smart watch, an augmented reality device, or a virtual reality device, a non-wearable device, a display or display device, a television, a television set-top box, an intermediate network device, a digital media player, a video streaming device, a content streaming device, an in-car computer, any mobile device, any device configured to generate graphical content, or any device configured to perform one or more techniques described herein. Processes herein may be described as performed by a particular component (e.g., a GPU), but, in further embodiments, may be performed using other components (e.g., a CPU), consistent with disclosed embodiments.

GPUs may process multiple types of data or data packets in a GPU pipeline. For instance, in some aspects, a GPU may process two types of data or data packets, e.g., context register packets and draw call data. A context register packet may be a set of global state information, e.g., information regarding a global register, shading program, or constant data, which may regulate how a graphics context will be processed. For example, context register packets may include information regarding a color format. In some aspects of context register packets, there may be a bit that indicates which workload belongs to a context register. Also, there may be multiple functions or programming running at the same time and/or in parallel. For example, functions or programming may describe a certain operation, e.g., the color mode or color format. Accordingly, a context register may define multiple states of a GPU.

Context states may be utilized to determine how an individual processing unit functions, e.g., a vertex fetcher (VFD), a vertex shader (VS), a shader processor, or a geometry processor, and/or in what mode the processing unit functions. In order to do so, GPUs may use context registers and programming data. In some aspects, a GPU may generate a workload, e.g., a vertex or pixel workload, in the pipeline based on the context register definition of a mode or state. Certain processing units, e.g., a VFD, may use these states to determine certain functions, e.g., how a vertex is assembled. As these modes or states may change, GPUs may need to change the corresponding context. Additionally, the workload that corresponds to the mode or state may follow the changing mode or state.

Figure 2:
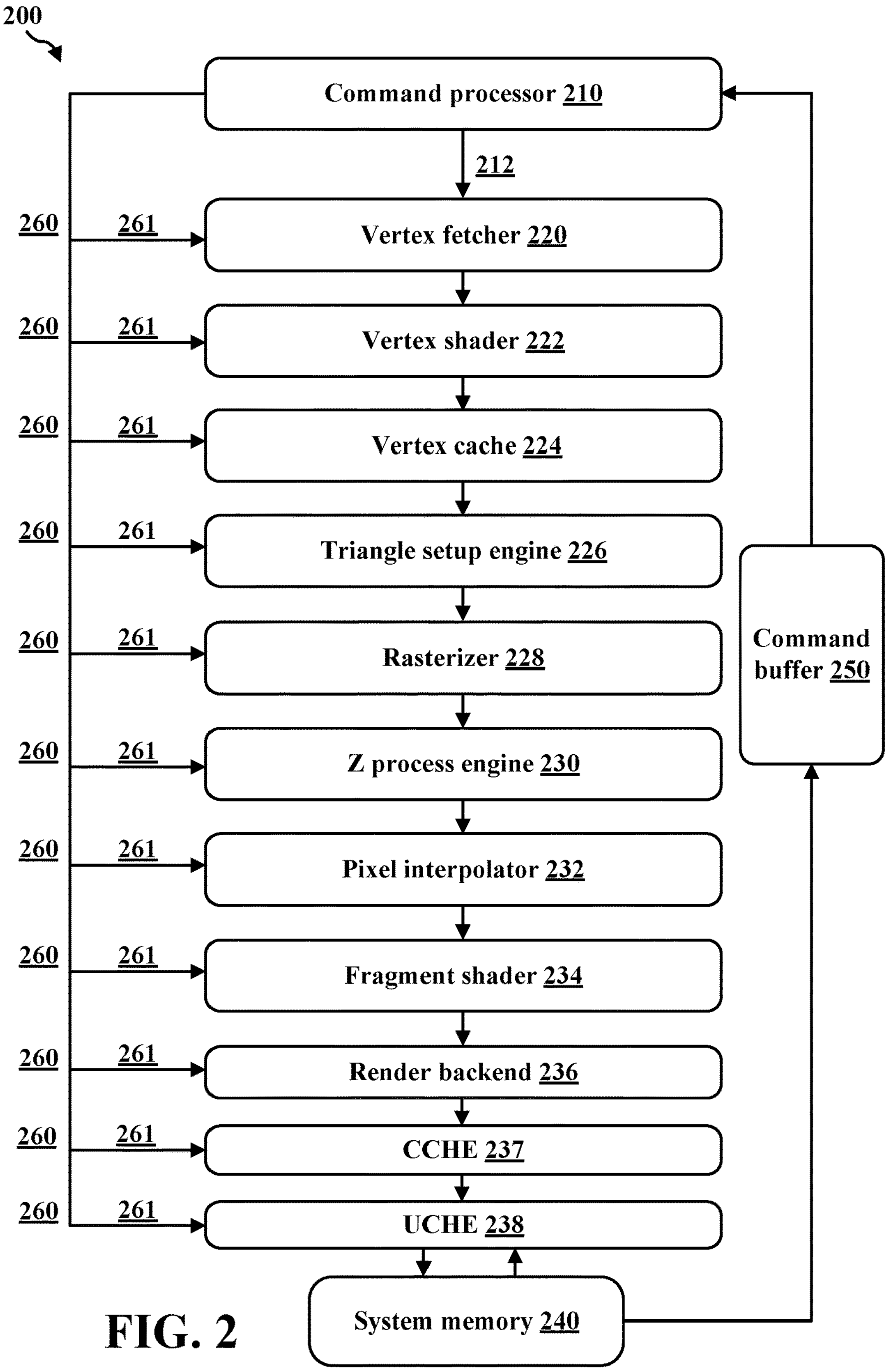
FIG. 2 illustrates an example graphics processing unit (GPU).

FIG. 2 illustrates an example GPU 200 in accordance with one or more techniques of this disclosure. As shown in FIG. 2, GPU 200 includes command processor (CP) 210, draw call packets 212, VFD 220, VS 222, vertex cache (VPC) 224, triangle setup engine (TSE) 226, rasterizer (RAS) 228, Z process engine (ZPE) 230, pixel interpolator (PI) 232, fragment shader (FS) 234, render backend (RB) 236, level 1 (L1) cache (cluster cache (CCHE)) 237, level 2 (L2) cache (UCHE) 238, and system memory 240. Although FIG. 2 displays that GPU 200 includes processing units 220-238, GPU 200 may include a number of additional processing units. Additionally, processing units 220-238 are merely an example and any combination or order of processing units may be used by GPUs according to the present disclosure. GPU 200 also includes command buffer 250, context register packets 260, and context states 261.

As shown in FIG. 2, a GPU may utilize a CP, e.g., CP 210, or hardware accelerator to parse a command buffer into context register packets, e.g., context register packets 260, and/or draw call data packets, e.g., draw call packets 212. The CP 210 may then send the context register packets 260 or draw call packets 212 through separate paths to the processing units or blocks in the GPU. Further, the command buffer 250 may alternate different states of context registers and draw calls. For example, a command buffer may be structured in the following manner: context register of context N, draw call(s) of context N, context register of context N+1, and draw call(s) of context N+1.

GPUs may render images in a variety of different ways. In some instances, GPUs may render an image using rendering and/or tiled rendering. In tiled rendering GPUs, an image may be divided or separated into different sections or tiles. After the division of the image, each section or tile may be rendered separately. Tiled rendering GPUs may divide computer graphics images into a grid format, such that each portion of the grid, i.e., a tile, is separately rendered. In some aspects, during a binning pass, an image may be divided into different bins or tiles. In some aspects, during the binning pass, a visibility stream may be constructed where visible primitives or draw calls may be identified. In contrast to tiled rendering, direct rendering does not divide the frame into smaller bins or tiles. Rather, in direct rendering, the entire frame is rendered at a single time. Additionally, some types of GPUs may allow for both tiled rendering and direct rendering.

Instructions executed by a CPU (e.g., software instructions) or a display processor may cause the CPU or the display processor to search for and/or generate a composition strategy for composing a frame based on a dynamic priority and runtime statistics associated with one or more composition strategy groups. A frame to be displayed by a physical display device, such as a display panel, may include a plurality of layers. Also, composition of the frame may be based on combining the plurality of layers into the frame (e.g., based on a frame buffer). After the plurality of layers are combined into the frame, the frame may be provided to the display panel for display thereon. The process of combining each of the plurality of layers into the frame may be referred to as composition, frame composition, a composition procedure, a composition process, or the like.

A frame composition procedure or composition strategy may correspond to a technique for composing different layers of the plurality of layers into a single frame. The plurality of layers may be stored in doubled data rate (DDR) memory. Each layer of the plurality of layers may further correspond to a separate buffer. A composer or hardware composer (HWC) associated with a block or function may determine an input of each layer/buffer and perform the frame composition procedure to generate an output indicative of a composed frame. That is, the input may be the layers and the output may be a frame composition procedure for composing the frame to be displayed on the display panel.

Some types of GPUs may include different types of pipelines, such as a graphics processing pipeline. Graphics processing pipelines may include one or more of a vertex shader stage, a hull shader stage, a domain shader stage, a geometry shader stage, and a pixel shader stage. These stages of the graphics processing pipeline may be considered shader stages. These shader stages may be implemented as one or more shader programs that execute on shader units at a GPU. Shader units may be configured as a programmable pipeline of processing components. In some examples, a shader unit may be referred to as "shader processors" or "unified shaders," and may perform geometry, vertex, pixel, or other shading operations to render graphics. Shader units may include shader processors, each of which may include one or more components for fetching and decoding operations, one or more arithmetic logic units (ALUs) for carrying out arithmetic calculations, one or more memories, caches, and registers.

Figure 3:
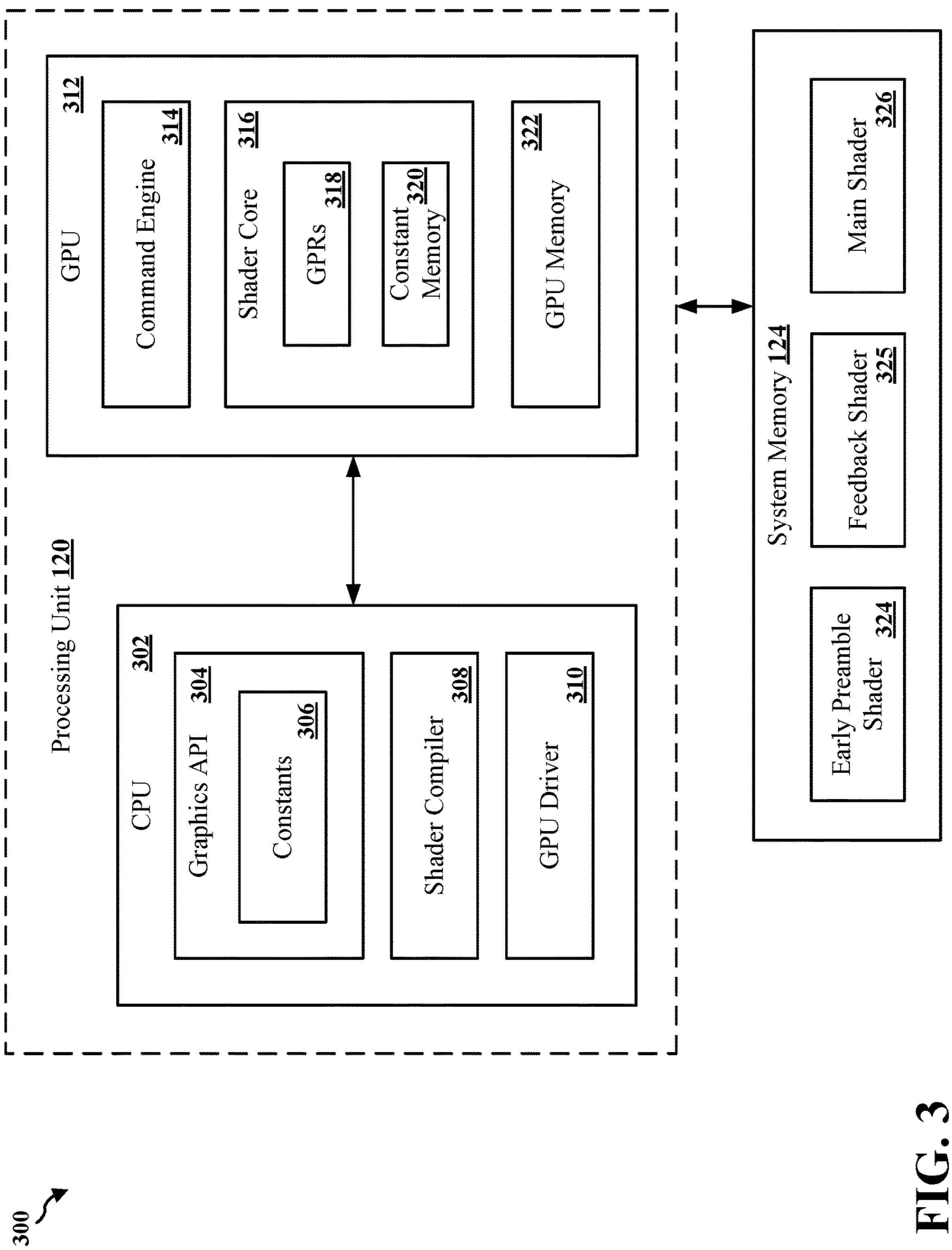
FIG. 3 is a diagram illustrating example processing components.

FIG. 3 is a diagram 300 that illustrates processing components, such as the processing unit 120 and the system memory 124, as may be identified in connection with the device 104 for processing data. In aspects, the processing unit 120 may include a CPU 302 and a GPU 312. The GPU 312 and the CPU 302 may be formed as an integrated circuit (e.g., a system-on-a-chip (SOC)) and/or the GPU 312 may be incorporated onto a motherboard with the CPU 302. Alternatively, the CPU 302 and the GPU 312 may be configured as distinct processing units that are communicatively coupled to each other. For example, the GPU 312 may be incorporated on a graphics card that is installed in a port of the motherboard that includes the CPU 302.

The CPU 302 may be configured to execute a software application that causes graphical content to be displayed (e.g., on the display(s) 131 of the device 104) based on one or more operations of the GPU 312. The software application may issue instructions to a graphics application program interface (API) 304, which may be a runtime program that translates instructions received from the software application into a format that is readable by a GPU driver 310. After receiving instructions from the software application via the graphics API 304, the GPU driver 310 may control an operation of the GPU 312 based on the instructions. For example, the GPU driver 310 may generate one or more command streams that are placed into the system memory 124, where the GPU 312 is instructed to execute the command streams (e.g., via one or more system calls). A command engine 314 included in the GPU 312 is configured to retrieve the one or more commands stored in the command streams. The command engine 314 may provide commands from the command stream for execution by the GPU 312. The command engine 314 may be hardware of the GPU 312, software/firmware executing on the GPU 312, or a combination thereof. While the GPU driver 310 is configured to implement the graphics API 304, the GPU driver 310 is not limited to being configured in accordance with any particular API. The system memory 124 may store the code for the GPU driver 310, which the CPU 302 may retrieve for execution. In examples, the GPU driver 310 may be configured to allow communication between the CPU 302 and the GPU 312, such as when the CPU 302 offloads graphics or non-graphics processing tasks to the GPU 312 via the GPU driver 310.

The system memory 124 may further store source code for one or more of an early preamble shader 324, a feedback shader 325, or a main shader 326. In such configurations, a shader compiler 308 executing on the CPU 302 may compile the source code of the shaders 324-326 to create object code or intermediate code executable by a shader core 316 of the GPU 312 during runtime (e.g., at the time when the shaders 324-326 are to be executed on the shader core 316). In some examples, the shader compiler 308 may pre-compile the shaders 324-326 and store the object code or intermediate code of the shader programs in the system memory 124. The shader compiler 308 (or in another example the GPU driver 310) executing on the CPU 302 may build a shader program with multiple components including the early preamble shader 324, the feedback shader 325, and the main shader 326. The main shader 326 may correspond to a portion or the entirety of the shader program that does not include the early preamble shader 324 or the feedback shader 325. The shader compiler 308 may receive instructions to compile the shader(s) 324-326 from a program executing on the CPU 302. The shader compiler 308 may also identify constant load instructions and common operations in the shader program for including the common operations within the early preamble shader 324 (rather than the main shader 326). The shader compiler 308 may identify such common instructions, for example, based on (presently undetermined) constants 306 to be included in the common instructions. The constants 306 may be defined within the graphics API 304 to be constant across an entire draw call. The shader compiler 308 may utilize instructions such as a preamble shader start to indicate a beginning of the early preamble shader 324 and a preamble shader end to indicate an end of the early preamble shader 324. Similar instructions may be used for the feedback shader 325 and the main shader 326. The feedback shader 325 will be described in further detail below.

The shader core 316 included in the GPU 312 may include general purpose registers (GPRs) 318 and constant memory 320. The GPRs 318 may correspond to a single GPR, a GPR file, and/or a GPR bank. Each GPR in the GPRs 318 may store data accessible to a single thread. The software and/or firmware executing on GPU 312 may be a shader program 324-326, which may execute on the shader core 316 of GPU 312. The shader core 316 may be configured to execute many instances of the same instructions of the same shader program in parallel. For example, the shader core 316 may execute the main shader 326 for each pixel that defines a given shape. The shader core 316 may transmit and receive data from applications executing on the CPU 302. In examples, constants 306 used for execution of the shaders 324-326 may be stored in a constant memory 320 (e.g., a read/write constant RAM) or the GPRs 318. The shader core 316 may load the constants 306 into the constant memory 320. In further examples, execution of the early preamble shader 324 or the feedback shader 325 may cause a constant value or a set of constant values to be stored in on-chip memory such as the constant memory 320 (e.g., constant RAM), the GPU memory 322, or the system memory 124. The constant memory 320 may include memory accessible by all aspects of the shader core 316 rather than just a particular portion reserved for a particular thread such as values held in the GPRs 318.

Figure 4:
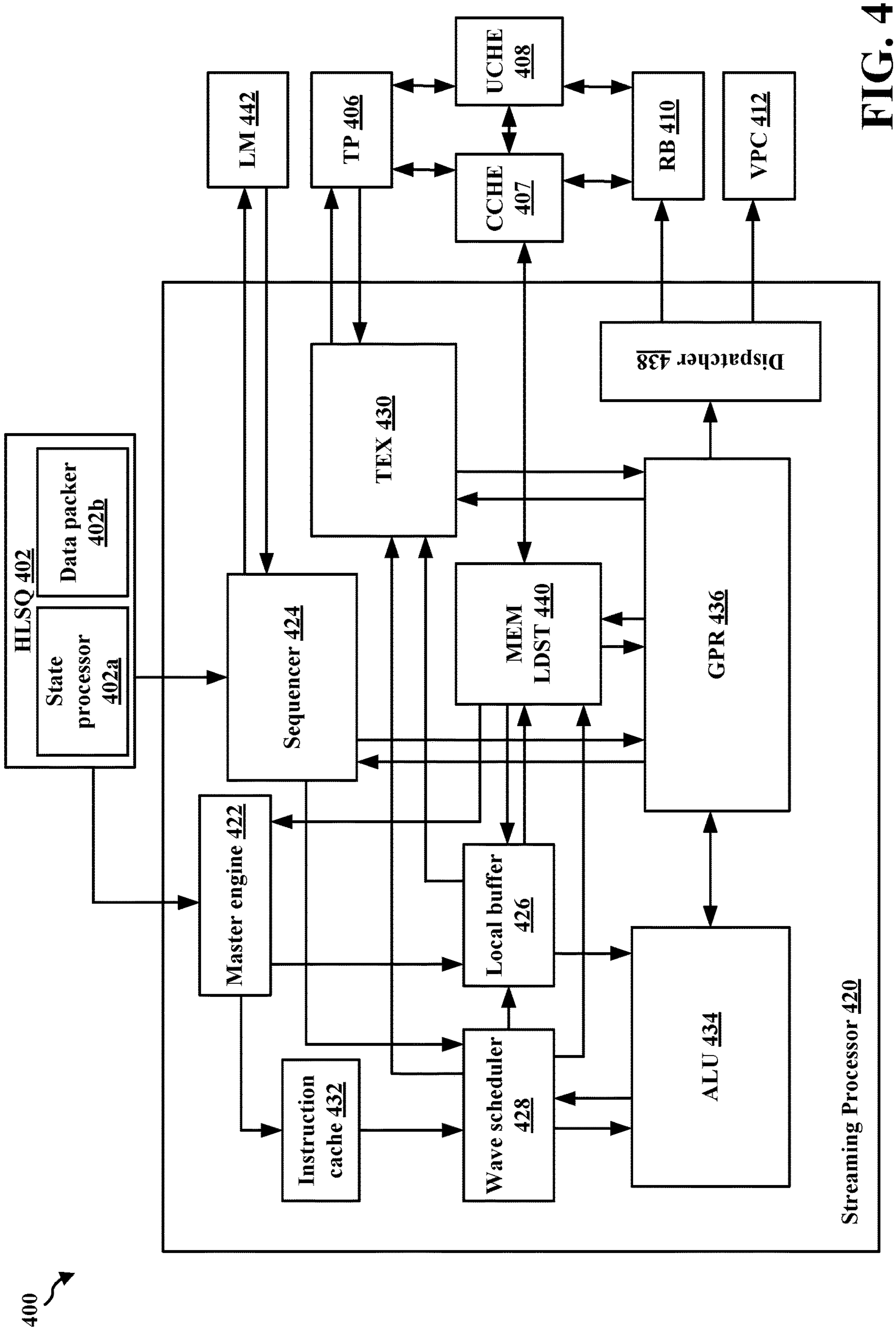
FIG. 4 is a diagram illustrating an example GPU.

FIG. 4 illustrates an example GPU 400. Specifically, FIG. 4 illustrates a streaming processor (SP) system in GPU 400. As shown in FIG. 4, GPU 400 includes a high level sequencer (HLSQ) 402, texture processor (TP) 406, level 1 (L1) cache (cluster cache (CCHE)) 407, level 2 (L2) cache (UCHE) 408, render backend (RB) 410, and vertex cache (VPC) 412. GPU 400 also includes SP 420, master engine 422, sequencer 424, local buffer 426, wave scheduler 428, texture (TEX) 430, instruction cache 432, arithmetic logic unit (ALU) 434, GPR 436, dispatcher 438, and memory (MEM) load store (LDST) 440.

As shown in FIG. 4, each unit or block in GPU 400 may send data or information to other blocks. For instance, HLSQ 402 may send commands to the master engine 422. Also, HLSQ 402 may send vertex threads, vertex attributes, pixel threads, pixel attributes, and/or compute commands to the sequencer 424. TP 406 may receive texture requests from TEX 430, and send texture elements (texels) back to the TEX 430. Further, TP 406 may send memory read requests to and receive memory data from CCHE 407 or UCHE 408. CCHE 407 or UCHE 408 may also receive memory read or write requests from MEM LDST 440 and send memory data back to MEM LDST 440, as well as receive memory read or write requests from RB 410 and send memory data back to RB 410. Also, RB 410 may receive an output in the form of color from GPR 436, e.g., via dispatcher 438. VPC 412 may also receive output in the form of vertices from GPR 436, e.g., via dispatcher 438. GPR 436 may send address data or receive write back data from MEM LDST 440. GPR 436 may also send temporary data to and receive temporary data from ALU 434. Moreover, ALU 434 may send address or predicate information to the wave scheduler 428, as well as receive instructions from wave scheduler 428. Local buffer 426 may send constant data to ALU 434. TEX 430 may also receive texture attributes from or send texture data to GPR 436, as well as receive constant data from local buffer 426. Further, TEX 430 may receive texture requests from wave scheduler 428, as well as receive constant data from local buffer 426. MEM LDST 440 may send/receive constant data to/from local buffer 426. Sequencer 424 may send wave data to wave scheduler 428, as well as send/receive data to/from GPR 436. The sequencer 424 may allocate resources and local memory (e.g., local memory (LM) 442). Also, the sequencer 424 may allocate wave slots and any associated GPR 436 space. For example, the sequencer 424 may allocate wave slots or GPR 436 space when the HLSQ 402 issues a pixel tile workload to the SP 420. Master engine 422 may send program data to instruction cache 432, as well as send constant data to local buffer 426 and receive instructions from MEM LDST 440. Instruction cache 432 may send instructions or decode information to wave scheduler 428. Wave scheduler 428 may send read requests to local buffer 426, as well as send memory requests to MEM LDST 440.

As further shown in FIG. 4, the HLSQ 402 may prepare one or more context states for the SP 420. For example, the HLSQ 402 may prepare the context states for different types of data, e.g., global register data, shader constant data, buffer descriptors, instructions, etc. Additionally, the HLSQ 402 may embed context states into a command stream to the SP 420. The master engine 422 may parse the command stream from the HLSQ 402 and setup an SP global state. Moreover, the master engine 422 may fill or add to an instruction cache 432 and/or a local buffer 426 or a constant buffer. In some aspects, inside the HLSQ 402, there may be an internal function unit called a state processor 402*a*. The state processor 402*a* may be a single fiber scalar processor that may execute a special shader program, e.g., a preamble shader. The preamble shader may be generated by the GPU compiler in order to load constant data from different buffer objects. Also, the preamble shader may bind the buffer objects into a single constant buffer, such as a post-process constant buffer. Further, the HLSQ 402 may execute the preamble shader and, as a result, skip utilizing a main shader. In some instances, the main shader may perform different shading tasks, such as normal vertex shading and/or a fragment shading program. Moreover, the HLSQ 402 may include a data packer 402*b*.

Additionally, as shown in FIG. 4, the SP 420 may not be limited to executing a preamble if the HLSQ 402 decides to skip a preamble execution. For instance, the SP 420 may also process a conventional graphics workload, such as vertex shading and/or fragment shading. In some aspects, the SP 420 may utilize its execution units and storage in order to process compute tasks as a general purpose GPU (GPGPU). Inside the SP 420, there may be multiple parallel instruction execution units such as an ALU, elementary function unit (EFU), branching unit, TEX, general memory read and write (aka LDST), etc. The SP 420 may also include on-chip storage memory, such as a GPR 436 which may store per-fiber private data. Also, the SP 420 may include a local buffer 426 which stores per-shader or per-kernel constant data, per-wave uniform data (aka uGPR), and per-compute work group (WG) local memory (LM) (e.g., local memory (LM) 442). Processing a preamble shader may take up one wave slot. Further, the majority of preamble shaders may use just the uGPR and not the GPR, and may execute ALU instructions on a scalar ALU. Therefore, execution of the preamble shader may be associated with high performance, and may be power efficient because any available wave slot may be used to execute the preamble shader even without GPR space allocation.

Moreover, as shown in FIG. 4, dispatcher 438 may fetch data from GPR 436. Dispatcher 438 may also perform format conversion, and then dispatch a final color to multiple render targets (RTs). Each RT may have one or more components, such as red (r) green (G) blue (B) alpha (A) (RGBA) data, or just an alpha component of the RGBA data. Further, each RT may be generally stored in a vector GPR, i.e., R3.0 may store red data, R3.1 may store green data, R3.2 may store blue data, etc. Also, a driver program in an SP context register may be utilized to define the GPR identifier (ID) which stores RT data.

Figure 5:
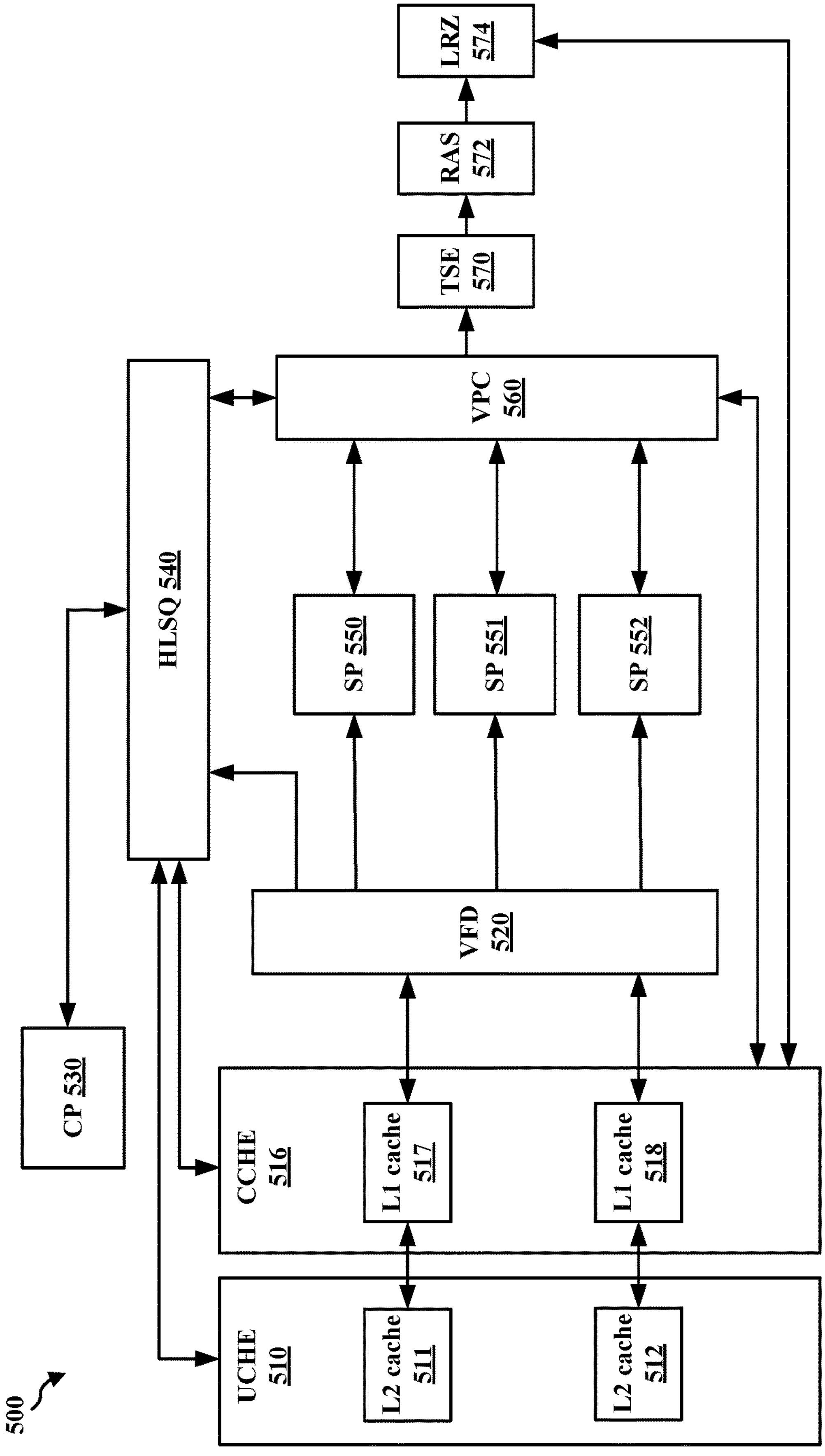
FIG. 5 is a diagram illustrating an example GPU.

FIG. 5 is a diagram illustrating another example GPU. More specifically, FIG. 5 depicts GPU 500 including a number of different components. As shown in FIG. 5, GPU 500 includes UCHE 510 including L2 cache 511 and L2 cache 512, CCHE 516 including L1 cache 517 and L1 cache 518, VFD 520, CP 530, HLSQ 540, a number of SPs (e.g., SP 550, SP 551, and SP 552), VPC 560, TSE 570, RAS 572, and low resolution Z (LRZ) component (e.g., LRZ 574). As shown in FIG. 5, CP 530 may transmit data to HLSQ 540 and receive data from HLSQ 540. CCHE 516 may transmit/receive data to/from HLSQ 540. UCHE 510 may also transmit/receive data to/from HLSQ 540. L2 cache 511 and L2 cache 512 may transmit/receive data to/from VFD 520. Further, VFD 520 may transmit data to HLSQ 540, as well as transmit data to SPs 550-552. Moreover, SPs 550-552 may transmit/receive data to/from VPC 560. Also, VPC 560 may transmit/receive data to/from HLSQ 540. Data can also be transmitted from VPC 560 to TSE 570, which can transmit data to RAS 572, and then to LRZ 574. CCHE 516 can transmit/receive data to/from VPC 560 and LRZ 574. Also, UCHE 510 can transmit/receive data to/from VPC 560 and LRZ 574.

As depicted in FIG. 5, GPUs (e.g., GPU 500) may include a number of different caches. GPUs utilize caches for a variety of reasons, such as to transfer data at a sufficiently high rate of speed. That is, as processing power for GPUs has increased at a higher rate than memory access speed, storage resources (e.g., caches) between the processor and memory have been utilized to transfer data at a sufficient rate. Caches at GPUs are also utilized to more seamlessly transfer data. One benefit of caches is that they provide buffering, so caches and buffers may be similar. For instance, caches may decrease latency by reading data from memory in larger chunks based on subsequent data accessing nearby address locations. Also, caches may increase throughput by assembling multiple small transfers into larger, more efficient memory requests. These benefits may be achieved by a cache storing data in blocks called cache lines. A cache line may be a portion of data that can be mapped into a cache. For example, a cache line may be a smallest portion of data that can be mapped into a cache.

In some aspects, each mapped cache line may be associated with a block (e.g., a core line), which is a corresponding region on a main memory or a backend storage). A backend storage may allow performance for the cache and GPU to improve. For example, database caching may allow an increased throughput and a reduced data retrieval latency associated with backend databases, which may improve the overall performance of the cache and GPU. Also, in some aspects, both the cache and main memory/backend storage may be divided into blocks of the size of a cache line. Further, all the cache mappings may be aligned to these blocks. Cache lines may have a certain size (e.g., between 32 to 512 bytes), and memory transactions may be performed in units of cache lines. Individual cache accesses made by code that executes on a GPU processor may be smaller than these units of cache lines (e.g., 4 bytes).

Figure 6:
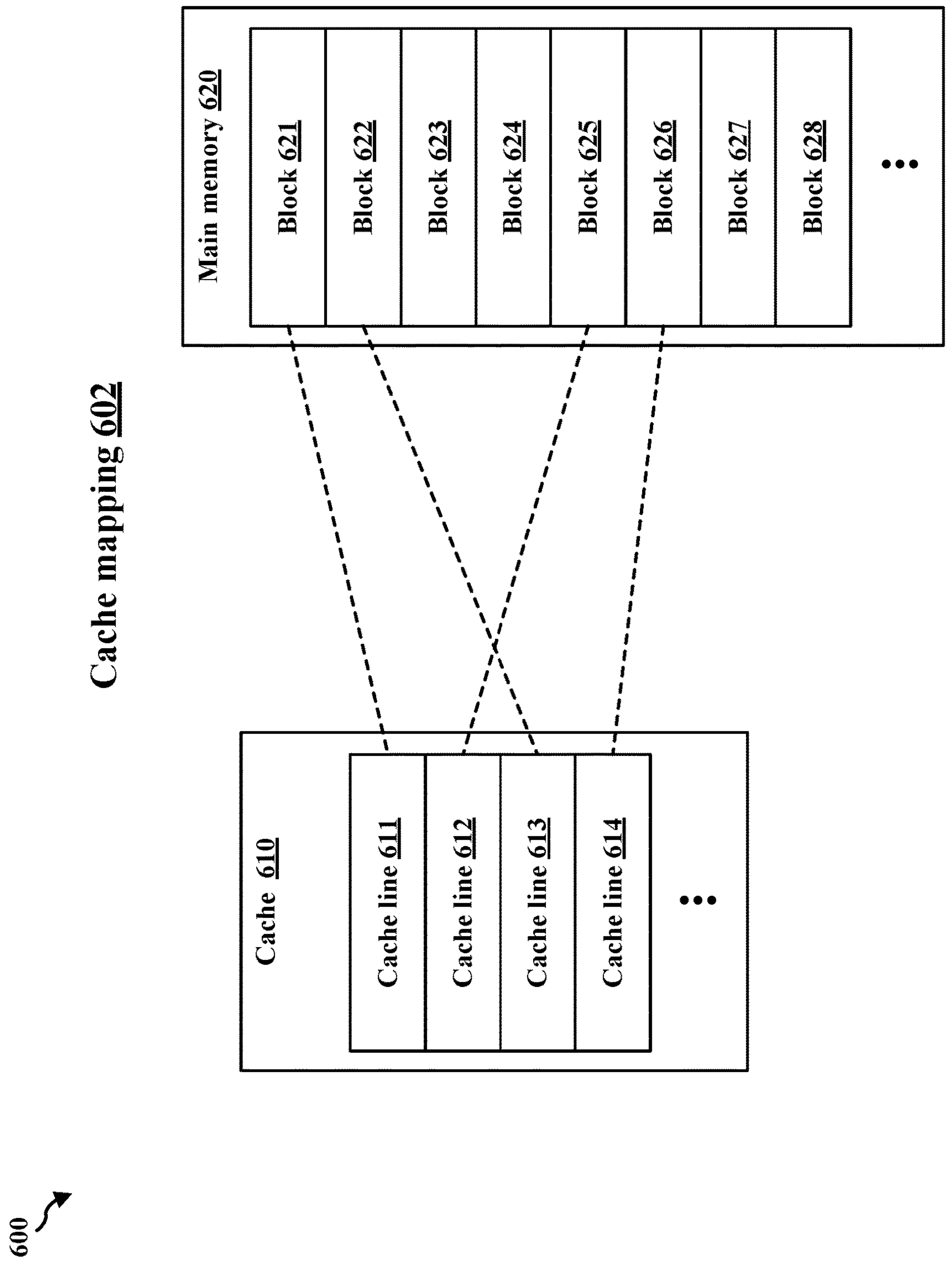
FIG. 6 is a diagram illustrating an example mapping of a cache.

FIG. 6 is a diagram 600 illustrating an example mapping of a cache. More specifically, FIG. 6 depicts a cache mapping 602 for a cache 610 and a main memory 620. That is, FIG. 6 depicts the relationship between cache lines in cache 610 (e.g., cache line 611, cache line 612, cache line 613, and cache line 614) and blocks in main memory 620 (e.g., block 621, block 622, block 623, block 624, block 625, block 626, block 627, and block 628). As shown in FIG. 6, diagram 600 illustrates that individual blocks 621-628 may be directly mapped to individual cache lines 611-614. For example, as illustrated in diagram 600, block 621 may be mapped to cache line 611, block 622 may be mapped to cache line 613, block 625 may be mapped to cache line 612, and block 626 may be mapped to cache line 614. Some of the blocks 621-628 may not be directly mapped to cache lines 611-614. For instance, block 623, block 624, block 627, and block 628 may not be directly mapped to cache lines 611-614. In some aspects, main memory 620 including blocks 621-628 may be a backend storage including a number of core lines.

Valid data (e.g., valid bits) and dirty data (e.g., dirty bits) may correspond to a current cache line state. For instance, when a cache line is valid (i.e., in a valid state) it may refer to the cache line being mapped to a block in main memory (e.g., a core line determined by a core identifier (ID) and a core line number). When a cache line is invalid (i.e., in an invalid state), it may be used to map a core line accessed by a certain request (e.g., an input/output (I/O) request), and the cache line may become valid thereafter. A cache line may return to an invalid state based on a number of different reasons. For example, a cache line may return to an invalid state: if the cache line is being evicted, if the core pointed to by the core ID is being removed, if the core pointed to by the core ID is being purged, if the entire cache is being purged, during a discard operation being performed on a corresponding core line, or during a certain request (e.g., an I/O request) when a cache mode which may perform an invalidation is selected.

In some aspects, dirty data or modified data may refer to data that is associated with a block of memory and indicates whether the corresponding block of memory has been modified. For example, a dirty bit or modified bit may be a bit that is associated with a block of memory and indicates whether the corresponding block of memory has been modified. The dirty data (e.g., dirty bit) may be set when a processor writes to (i.e., modifies) this memory. For instance, the dirty data (e.g., dirty bit) may indicate that its associated block of memory has been modified and has not been saved to storage yet. That is, "dirty data" may refer to data in a cache that is modified, but the memory still has an old or stale copy of the data. In some instances, when a block of memory is to be replaced, its corresponding dirty data (e.g., dirty bit) may be checked to determine if the block may need to be written back to secondary memory before being replaced or if it can simply be removed. Moreover, dirty data (e.g., dirty bit) may determine if the cache line data stored in the cache is in synchronization with corresponding data on the backend storage. For instance, if a cache line is dirty, then data on the cache storage may be up to date, and the data may need to be flushed (i.e., removed) at some point in the future (e.g., after the flushing the data may be marked as clean by zeroing a dirty bit). Also, a cache line may be considered valid if at least one of its sectors is valid. Likewise, a cache line may be considered dirty if at least one of its sectors is dirty.

In some instances, a goal of caches in GPUs may be to increase the performance of repeated accesses to the same data, as caches may keep a copy of a subset of the data in memory. Accordingly, subsequent accesses of the data already in the cache may not utilize an expensive memory access transaction. As some caches may have a smaller capacity than the memory size of the GPU system, the currently-cached data set may continuously change. This continuously change in cached data may be due to the memory access pattern of the executed code and/or the data replacement policy of the cache. This performance improvement may be important for GPUs, as GPUs may serve numerous simultaneously running threads with data.

Caches may receive a number of requests (e.g., data or content requests) to store or cache data. A cache hit may refer to an event when data requested for processing (e.g., requested by a component or application) is successfully retrieved from the cache memory. For example, a cache hit may describe when data or content is successfully found in the cache. That is, a cache hit may be when a system or application makes a request to retrieve data from a cache, and the specific data is currently in cache memory. A cache miss may refer to an event when data requested for processing (e.g., requested by a component or application) is not successfully retrieved from the cache memory. For example, a cache miss may describe when data or content is not successfully found in the cache. That is, a cache miss may be when a system or application makes a request to retrieve data from a cache, but that specific data is not currently in cache memory. Caches may be measured based on an amount of data requests that the cache is able to successfully fill.

There are a number of different types of caches that are utilized by GPUs. For instance, there are fully-associative caches, direct-mapped caches, and set-associative cache. A fully-associative cache may utilize a least recently used (LRU) cache policy, where there are a number of cells (e.g., M cells) that are each capable of holding a cache line corresponding to any of the memory locations (e.g., N memory locations). In the case of cache contention, the cache line that is not accessed the longest may be kicked out and replaced with a new cache line. A direct-mapped cache may directly map a block of memory to a single cache line which it can occupy. A set-associative cache may divide the address space into equal groups, which separately act as small fully-associative caches.

An associativity of a cache may refer to the size of the cache sets, or, i.e., how many different cache lines each data block can be mapped to. That is, the associativity of a cache may refer to a number of cache lines that are associated with a cache set for the cache. A cache set may include the number of cache lines in the cache. A higher associativity may result in a more efficient utilization of a cache, but may also increase the power/cost utilized by the cache. Likewise, a lower associativity may decrease the power/cost utilized by the cache, but may result in a less efficient utilization of the cache. The capacity of a cache may refer to the amount of data or information that can be stored in the cache. Additionally, the capacity or associativity of the cache may be adjusted based on a number of different factors of the GPU.

In some aspects, GPUs may include a number of different types of shaders. For instance, these shaders can be vertex shaders (e.g., shaders that work on vertices), pixel shaders, or compute shaders. In some instances, shaders may be software programs. So different types of shaders may run on GPUs, and particularly run on a portion of the GPU called the shader processor. Also, shader processors may have an associated instruction set.

In some aspects, the performance of shaders in GPUs may be limited by the number of available registers at the GPU. That is, the performance of vertex shaders, pixel shaders, and compute shaders may be limited by the number of available registers (e.g., context registers) in GPUs. In some aspects, shader processors at GPUs and CPUs may have their own instruction set and their performance may be limited by the number of available registers. Generally, GPUs may have a larger register count compared to CPUs. In some instances, an entire register count may be shared between a number of threads that are running concurrently on the GPU. So when a high amount of threads is running, the performance of the shader may be limited by the number of available registers.

In some aspects, GPUs may store that value from register back to the memory and bring the next value that is immediately needed for computation into the register. So GPUs may keep moving values from memory into registers when they are needed and GPUs move the value from memory back to the register (e.g., context register). When the value is not needed immediately, GPUs may move the value from the register back to the memory. The process of moving a value from the register back to the memory is referred to as register spill. Generally, GPUs use register spill to move the values that are needed from a context register to the memory (or vice versa) as they are needed.

In addition to the global memory, GPUs may have local memory. Local memory is a temporary memory (e.g., a scratchpad memory) that is available during the embed process. Each shader processor may have a certain amount of memory (e.g., 32 kB of local memory). In some aspects, the shader processor may determine that certain programs may not even use local memory. For instance, when there is a program which uses both local and global memory, the difference may be that values belonging to global memory are cacheable. That is, immediately after the value can be cached, if it is not needed immediately, it can go back to the DRAM. In some aspects, when a particular value is brought into local memory, it may stay there and does not get replaced. So, the value may be moved from local memory and back to the global memory manually by the software. In some instances, the local memory may have a small latency (e.g., a latency of two cycles).

In some aspects, a value may be moved from local memory, and then moved to global memory (e.g., L1 cache (cluster cache), L2 cache, last level cache (LLC), and DRAM). So when the value is needed again, it may be all the way in global memory (e.g., DRAM), which is a high amount of cycles of access latency (e.g., 150 latency cycles). This may take a long time and increase the overall latency in GPU performance. So GPUs may bump or move (i.e., spill) a value to global memory or local memory based on a load order. However, this does not consider the home of the memory. So values may be spilled (i.e., bumped or moved) to global memory without considering their memory home, which will increase latency if values with global memory are selected and these values are needed to be retrieved later. In some aspects, global memory may be backed up by caches and local memory may not be backed up by caches.

There are a fixed number of registers in GPUs and there may need to be support for a number of active waves. Each wave, depending on the shader, can consume a lot of registers. When the registers do not include enough space, the values may be spilled to memory. These values reside in the caches waiting to be accessed again. However, it is possible that before they are accessed again the lines can get replaced from smaller top level caches and those values may need to be obtained from larger higher latency caches. On the other hand, there may be a small constant latency for fast access local memory in GPUs.

As indicated herein, GPUs may be limited by the number of available registers (e.g., context registers). For example, the performance of a GPU may be limited by the number of available registers. In some instances, when data or a value (e.g., a pixel value or a shading value) is not immediately needed, that data may be moved to a cache. The data is moved in order to free up space in the registers (e.g., context registers), as space is limited in the registers. As an increasing amount of data/values are moved, the data/values may be moved from a cache to global memory or dynamic random access memory (DRAM). If this data/value is needed, it may take a long time to retrieve it. This data/value movement to global memory or DRAM may take a long time and/or utilize a high amount of processing power at a GPU, which in turn slows down GPU performance. Based on the above, it may be beneficial to select which data/values are to be moved to global memory and which data/values should stay in a cache.

Aspects of the present disclosure may select which data/values are to be moved to certain types of memory. For example, aspects presented herein may select which data/values are to be moved to global memory and which data/values should stay in local memory. For instance, aspects presented herein may utilize a compiler at a GPU (e.g., a register allocator in a compiler) to select which data/values are to be moved to global memory and which data/values should stay in local memory. That is, aspects presented herein may utilize a GPU compiler to select which data/values should be moved to one type of memory (e.g., global memory) and which data/values should stay in another type of memory (e.g., local memory). By doing so, aspects presented herein may increase the likelihood that data/values will not need to be retrieved from global memory, which takes much longer and slows down GPU performance. In turn, this will improve GPU performance. That is, aspects presented herein may move data/values to different types of memory (e.g., global memory or local memory) by considering the memory home of the data/ values. This will decrease the amount of latency when retrieving the data/values at a later time.

Aspects presented herein (e.g., shader compilers at a GPU) may optimize the use of local memory to better manage register value spills. This may ultimately lead to better performance at the GPU. Aspects presented herein may select data/values to spill (i.e., bump or move) from the context registers based on their memory home (e.g., local memory or global memory). So aspects presented herein may spill values from the context register to local memory (which is faster to retrieve than global memory), rather than spilling values to global memory (which takes longer to retrieve than local memory). That is, aspects presented herein may determine a memory home of data/value and then determine to spill (i.e., move) the data value to global memory or local memory based on the memory home of the data/value.

In some instances, aspects presented herein may be aware of local memory at the GPU, as well as global memory at the GPU, and determine where to spill data/values based on this awareness. By being aware of local memory and global memory, shader compilers at GPUs can optimize the decision making process (e.g., the decision making process in the register allocator at a shader compiler) to improve the overall performance at a GPU. Aspects presented herein may also utilize embedded processors, which have memories that are similar to local memories in GPUs. This utilization may be in addition to caches for global memory.

Aspects presented herein may utilize a register allocator in a shader compiler at a GPU in order to better manage register value spills in the GPU. Aspects presented herein may evaluate a distance in the number of GPU cycles and the amount of unique global memory data after which this value will be needed again. For example, if the distance is greater than a threshold and if the amount of unique data is greater than a cache size (e.g., CCHE size), then aspects presented herein may not spill this global memory value. Rather, if there is another register that holds a local memory value and is not going to be accessed in the near future, then aspects presented herein may spill that register to local memory. Additionally, aspects presented herein may also use unused local memory as a temporary fast access storage for register spill values.

As indicated above, aspects presented herein may utilize features of shader compilers at a GPU in order to improve the overall performance of the GPU. For instance, aspects presented herein may utilize a register allocator in a shader compiler at a GPU to better manage register value spills. This register allocator may be software at a shader compiler. That is, the shader compiler software may determine a memory home for data/value, and then determine/select to spill the data/value to one type of memory (e.g., global memory, local memory, etc.) based on the memory home of the data/value. This type of determination/selection may be utilized for a number of different types of workloads that run on GPUs. For example, the register allocator or shader compiler software may determine/select a memory location (e.g., global memory or local memory) in which to spill a pixel workload or a shading workload As indicated previously, the performance of certain shaders on GPUs may be limited by the number of available registers. By taking local/global memory of GPUs into account, compilers (e.g., shader compilers at GPUs) may more efficiently allocate the register usage at GPUs.

In some instances, whenever aspects presented herein decide to spill a value in the register, aspects presented herein may evaluate if the value belongs to global memory. Aspects presented herein (e.g., shader compiler software) may also evaluate the (e.g., distance D) distance D in number of GPU cycles and the amount of unique global memory data (e.g., global memory data A) after which this value will be needed again. If the distance D is greater than a threshold (e.g., threshold T) and if the amount of unique data A is greater than a cache size (e.g., CCHE size), then aspects presented herein may try not to spill this global memory value. Instead, aspects presented herein may determine if there is another register that holds a local memory value and is not going to be accessed in the relatively near future and if such a value exists, then aspects presented herein may spill that register to local memory. Aspects presented herein may do so because even if such a value is needed again, it may just need to be accessed from local memory, which is faster to access compared to global memory. For example, if unique data A is greater than a cache size (e.g., CCHE size), aspects presented herein may choose to spill a local memory value. That is, if unique data A is greater than CCHE size, aspects presented herein may determine that if the value is instead spilled to CCHE, such a value would be replaced from CCHE to a lower, larger level UCHE. As such, aspects presented herein may instead choose to spill a local memory value.

Figure 7:
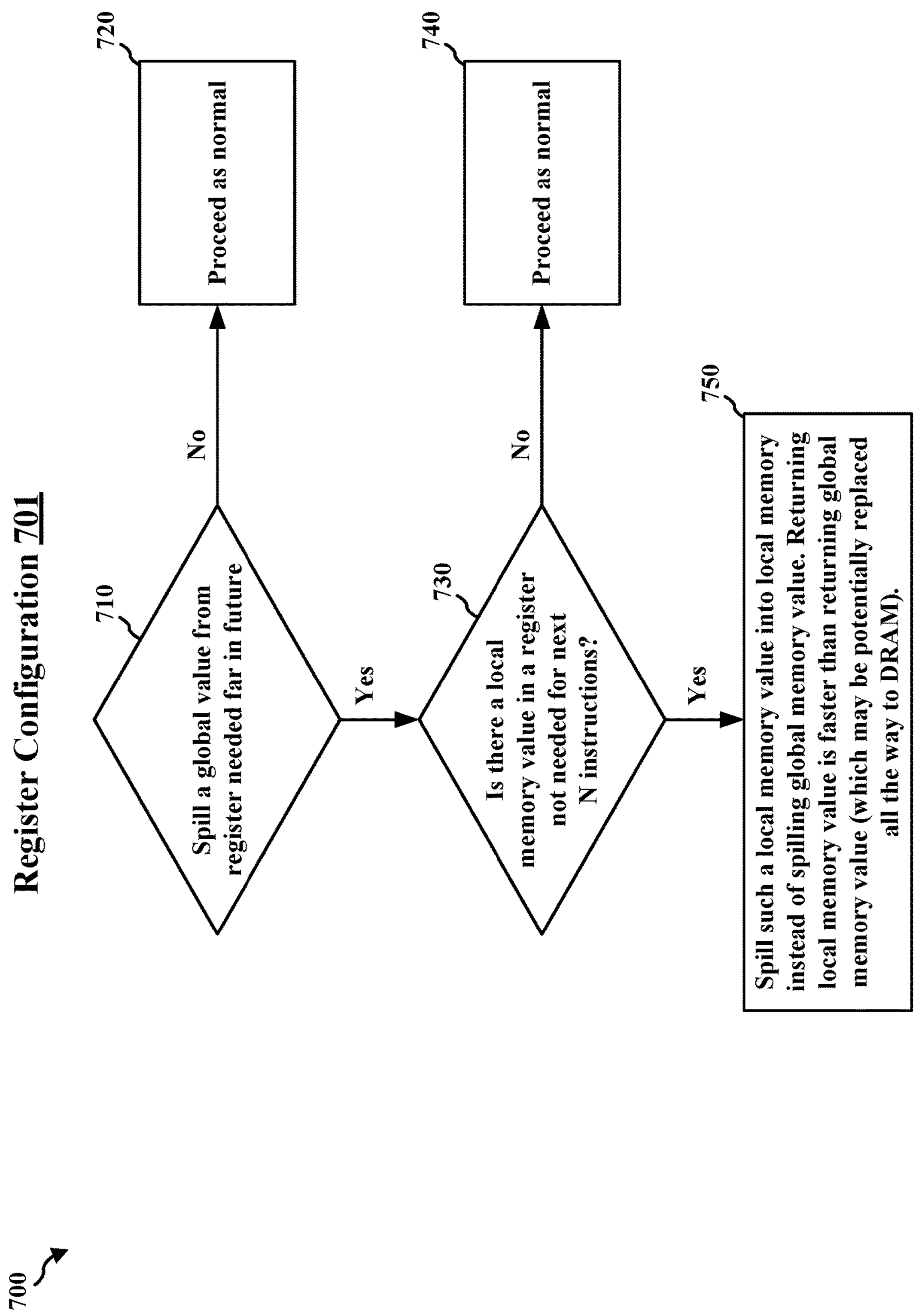
FIG. 7 is a diagram illustrating a flowchart for a register configuration.

FIG. 7 is a diagram 700 illustrating an example flowchart for a register configuration. More specifically, diagram 700 depicts a configuration for spilling data/values from a register or memory. As shown in FIG. 7, diagram 700 includes register configuration 701 including step 710, step 720, step 730, step 740, and step 750. At 710, aspects presented herein may determine whether to spill a global value from a register needed far into the future. For instance, aspects presented herein may determine whether to spill a global value from a register that is greater than a threshold time or a threshold number of instructions. If no at 710, at 720, aspects presented herein may proceed as normal. If yes at 710, at 730, aspects presented herein may determine whether there is a local memory value in a register that is not needed for a certain number of instructions (e.g., N instructions). For instance, aspects presented herein may determine whether there is a local memory value in a register that will not be utilized for a threshold time or a threshold number of instructions. If no at 730, at 740, aspects presented herein may proceed as normal. If yes at 730, at 750, aspects presented herein may spill (i.e., bump or move) such a local memory value into local memory instead of spilling the value to global memory value. As noted in FIG. 7, returning a local memory value may be faster than returning a global memory value (which may be potentially replaced all the way to DRAM).

In one example, aspects presented herein may load a first register value (R1) to a first global memory location (G1). Next, aspects presented herein may load a second register value (R2) to a second global memory location (G2). Also, aspects presented herein may load a third register value (R3) to a third global memory location (G3). After this, aspects presented herein may load a fourth register value (R4) to a first local memory location (L1). Next, aspects presented herein may load a fifth register value (R5) to a second local memory location (L2). Aspects presented herein may then perform a number of add instructions. Next, at a Label_L step, instead of spilling R2 back to global memory, aspects presented herein may spill R5 back to local memory. Also, at an AddN1 step, aspects presented herein may need a value in L2 a little later than Label_L. At an AddN2 step, aspects presented herein may needs a value in G2 much later than Label_L, if aspects presented herein had spilled R2 to global memory, by the time aspects presented herein reach this add instruction it is possible that that particular value would have been replaced from cache all the way to DRAM.

The aforementioned steps may be represented by the following example code:

```
Load R1, G1
Load R2, G2
Load R3, G3
Load R4, L1
Load R5, L2
Add1
Add2
. . .
Label_L: Store L2, R5//Here, instead of spilling R2 back
    to global memory aspects presented herein may spill
    R5 back to local memory.
Add3
. . .
Load R5, L2
AddN1//Need value in L2 a little later than Label_L.
. . .
AddN2//Need value in G2 much later than Label_L, if
    aspects presented herein had spilled R2 to global
    memory, by the time aspects presented herein reach this
    Add instruction, it may be possible that the particular
    value would have been replaced from cache all the way
    to DRAM.
```

In some instances, aspects presented herein may use unused local memory as a temporary fast access storage for register spill values. That is, aspects presented herein may utilize local memory as a temporary storage for spilling global memory values. For instance, when there is free space in local memory, and aspects presented herein need to temporarily spill register values belonging to global memory, then aspects presented herein may use the unused local memory to hold such values temporarily. This may result in faster accesses when aspects presented herein need to access spilled values again. Also, there is no risk of spilled values getting replaced from faster, smaller caches holding global memory values.

Figure 8:
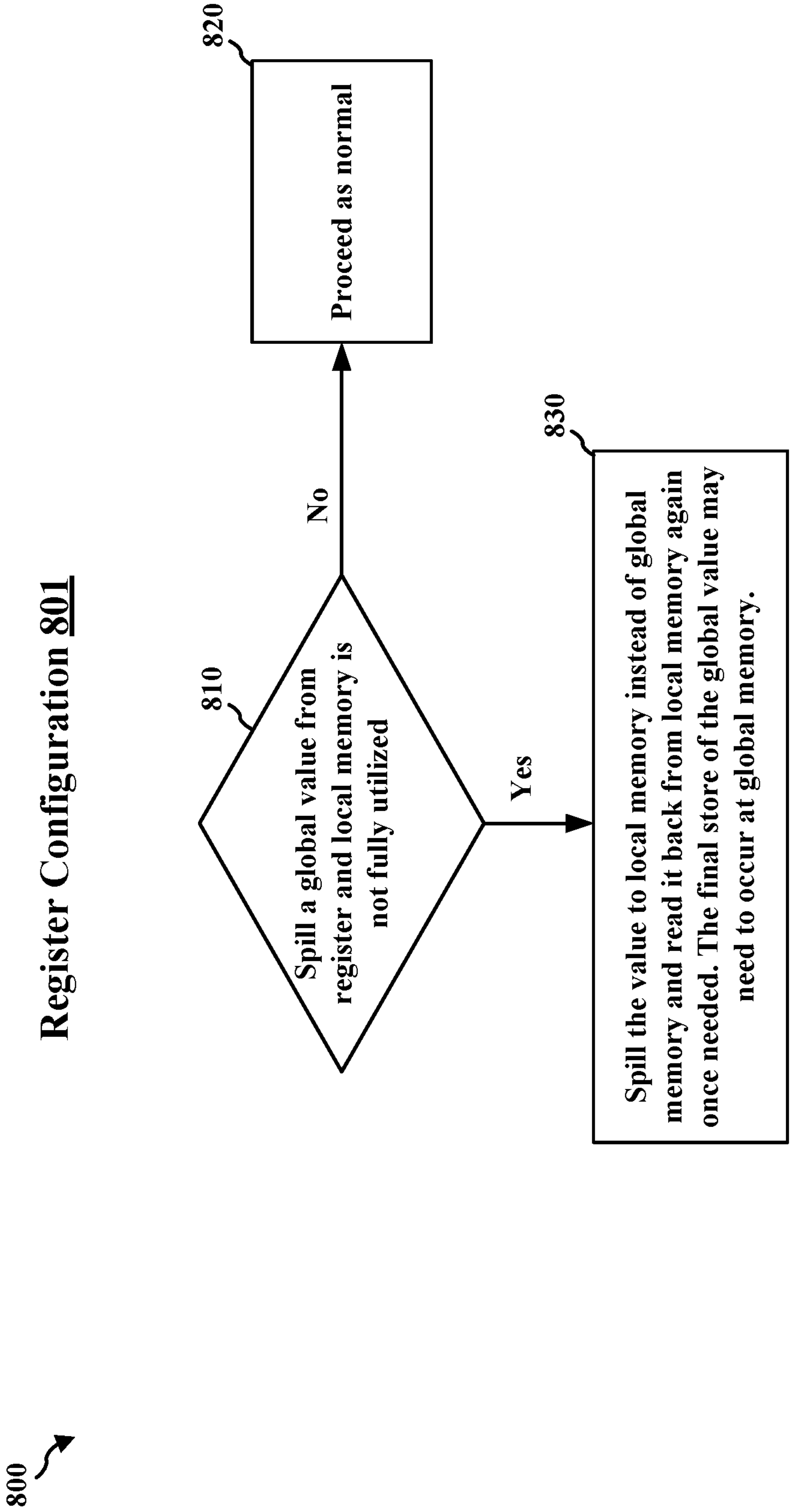
FIG. 8 is a diagram illustrating a flowchart for a register configuration.

FIG. 8 is a diagram 800 illustrating an example flowchart for a register configuration. More specifically, diagram 800 depicts a configuration for spilling data/values from a register or memory. As shown in FIG. 8, diagram 800 includes register configuration 801 including step 810, step 820, and step 830. At 810, aspects presented herein may determine whether to spill a global value from a register and local memory is not fully utilized. For instance, aspects presented herein may determine whether to local memory is fully utilized, and then determine whether to spill as to spill a global value from a register utilize the local memory as a temporary storage. If no at 810, at 820, aspects presented herein may proceed as normal. If yes at 810, at 830, aspects presented herein may spill the value to local memory instead of global memory. Aspects presented herein may read the value back from local memory once the value is needed. Accordingly, the local memory may be utilized as a temporary storage. As noted in FIG. 8, the final store of the global value may need to occur at global memory.

In another example, aspects presented herein may load a first register value (R1) to a first global memory location (G1). Next, aspects presented herein may load a second register value (R2) to a second global memory location (G2). Also, aspects presented herein may load a third register value (R3) to a third global memory location (G3). Aspects presented herein may then perform a number of add instructions including Add1, Add2, and AddN1. Next, at a Label_L1 step, instead of spilling R2 back to global memory, aspects presented herein may spill R2 to local memory. Also, at a Label_L2 step, instead of loading R2 back from global memory, aspects presented herein may load R2 from local memory. At an AddN2 step, aspects presented herein may utilize AddN2 for a value in R2.

The aforementioned steps may be represented by the following example code:

```
Load R1, G1
Load R2, G2
Load R3, G3
Add1
Add2
. . .
AddN1
Label_L1: Store L1, R2//Spill from R2 to local memory
    instead of global memory.
. . .
Label_L2: Load R2, L1//Load back R2 from local
    memory instead of global memory
AddN2//AddN2 uses value in R2.
```

Figure 9:
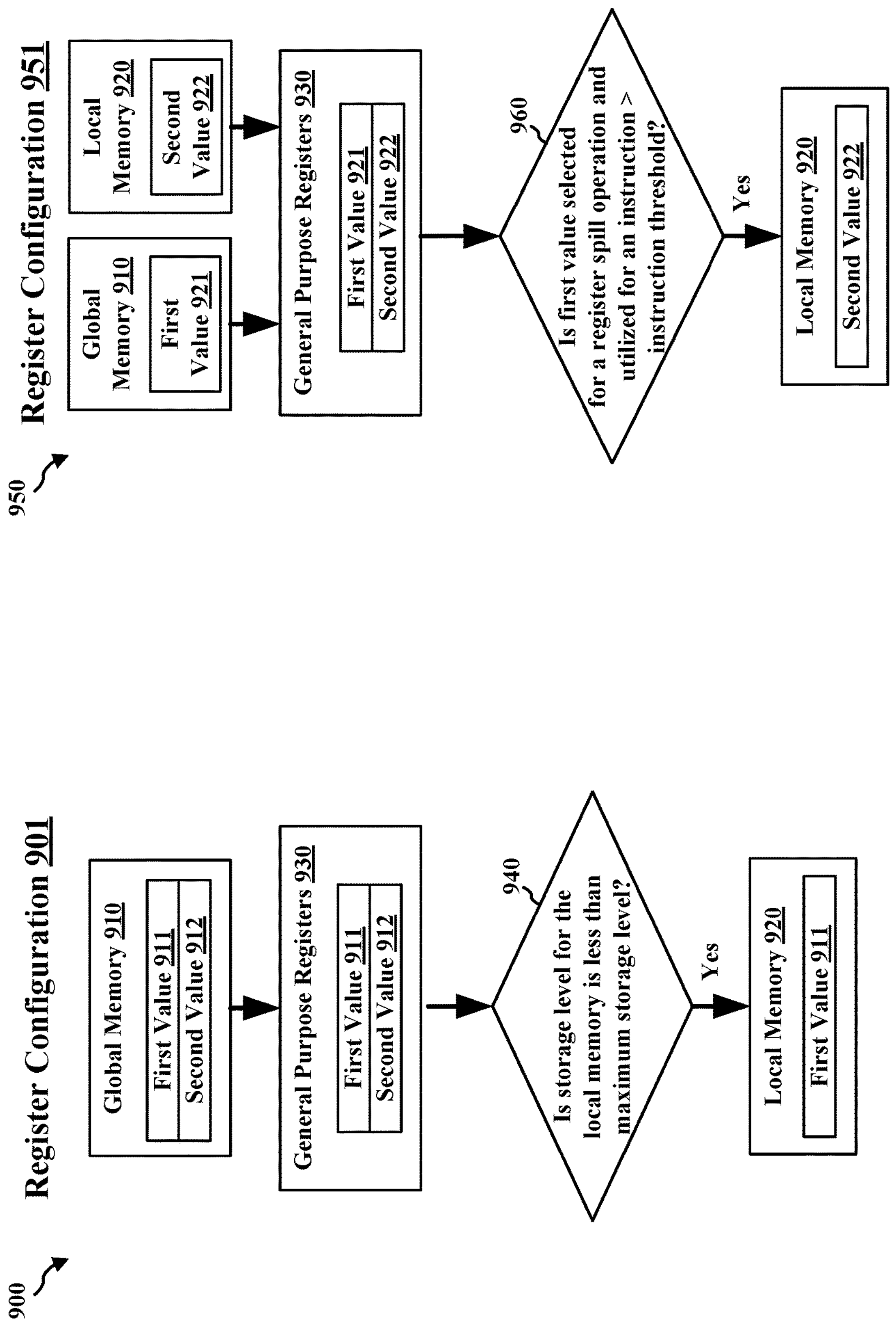
FIG. 9 is a diagram illustrating a flowchart for a register configuration.

FIG. 9 is a diagram 900 illustrating an example flowchart for a register configuration. More specifically, diagram 900 depicts a configuration for spilling data/values from a register or memory. As shown in FIG. 9, diagram 900 includes register configuration 901 including global memory 910, first value 911, second value 912, local memory 920, general purpose registers 930, and determination step 940. Diagram 900 depicts that a set of values (e.g., register values) may be loaded from their home of global memory 910 (e.g., first value 911 and second value 912). That is, the values may be loaded to general purpose registers 930. At 940, aspects presented herein may determine whether a storage level for the at least one second memory (e.g., local memory 920) is less than a maximum storage level. If yes at 940, aspects presented herein may store the at least one first value (e.g., first value 911) in the at least one second memory (e.g., local memory 920) based on the storage level for the at least one second memory being less than the maximum storage level. As further shown in FIG. 9, diagram 950 includes register configuration 951 including local memory 920, first value 921, second value 922, general purpose registers 930, and determination step 960. Diagram 950 depicts that a set of values (e.g., register values) may be loaded from their home of global memory 910 (e.g., first value 921) and local memory 920 (e.g., second value 922). That is, the values may be loaded to general purpose registers 930. At 960, aspects presented herein may determine whether at least one first value in the set of values is selected for a register spill operation and will be utilized for an instruction that is after an instruction threshold, where the at least one first value is associated with the at least one first memory (e.g., global memory 910). If yes at 960, aspects presented herein may store at least one second value (e.g., second value 922) in the set of values in the at least one second memory (e.g., local memory 920) based on the at least one first value being selected for the register spill operation and being utilized for the instruction that is after the instruction threshold, where the at least one second value is associated with the at least one second memory.

In other aspects, unused local memory may be utilized to temporarily hold spilled global memory values. Also, local memory may hold global memory values. For instance, the shader program may not use the entire local memory. That is, there may be some unused local memory. Hence, when a value V is spilled in a register R, where the "home" of value V is global memory, instead of spilling into caches, aspects presented herein may spill the value V to local memory. Aspects presented herein may do so because local memory has a deterministic low latency, as opposed to caches where it is possible that the value V may get replaced all the way to DRAM, in which case a high latency would be incurred to bring back the value V from DRAM to registers. As such, aspects presented herein may utilize unused local memory to temporarily hold spilled global memory values.

In some aspects, the shader program may use both local memory and global memory, as well as trade off spilling global memory values with spilling local memory values. By doing so, aspects presented herein may reduce the overall latency. Also, in some aspects, local memory may not hold global memory values. For instance, in the shader program, when a value V in a register R may need to be spilled to memory, aspects presented herein may select that value that is needed farthest in the future. If the "home" of such a value V is global memory, then it is possible that when value V is spilled to caches, since V is not needed immediately (e.g., for the next hundred or so GPU cycles), then the next time value V is needed, it may have been replaced from a primary cache all the way to DRAM. Hence, it may take a certain number of cycles (e.g., around 150 cycles) to fetch value V from DRAM. Instead, if aspects presented herein chose to spill a value P whose "home" is local memory instead of value V, aspects presented herein may have spilled/stored that value in local memory. When the value P is needed again, aspects presented herein may load it from local memory, which is merely a few cycles away (e.g., two cycles). Indeed, unlike caches, a value in local memory may remain in local memory unless the shader program physically moves it. Also, at the end of the program, if the value P is needed to be retained permanently, then such values in the local memory may be physically moved by the shader program from local memory to DRAM.

Aspects of the present disclosure may include a number of benefits or advantages. For instance, aspects presented herein may improve the performance (e.g., shader performance) at GPUs. In order to do so, aspects of the present disclosure may select which data/values are to be moved to global memory and which data/values should stay in local memory. For instance, aspects presented herein may utilize a compiler at a GPU (e.g., a register allocator in a compiler) to select which data/values are to be moved to global memory and which data/values should stay in local memory. By doing so, aspects presented herein may increase the likelihood that data/values will not need to be retrieved from global memory, which takes much longer and slows down GPU performance. In turn, this will improve GPU performance. That is, aspects presented herein may move data/values to different types of memory (e.g., global memory or local memory) by considering the memory home of the data/values. This will decrease the amount of latency when retrieving the data/values at a later time.

Figure 10:
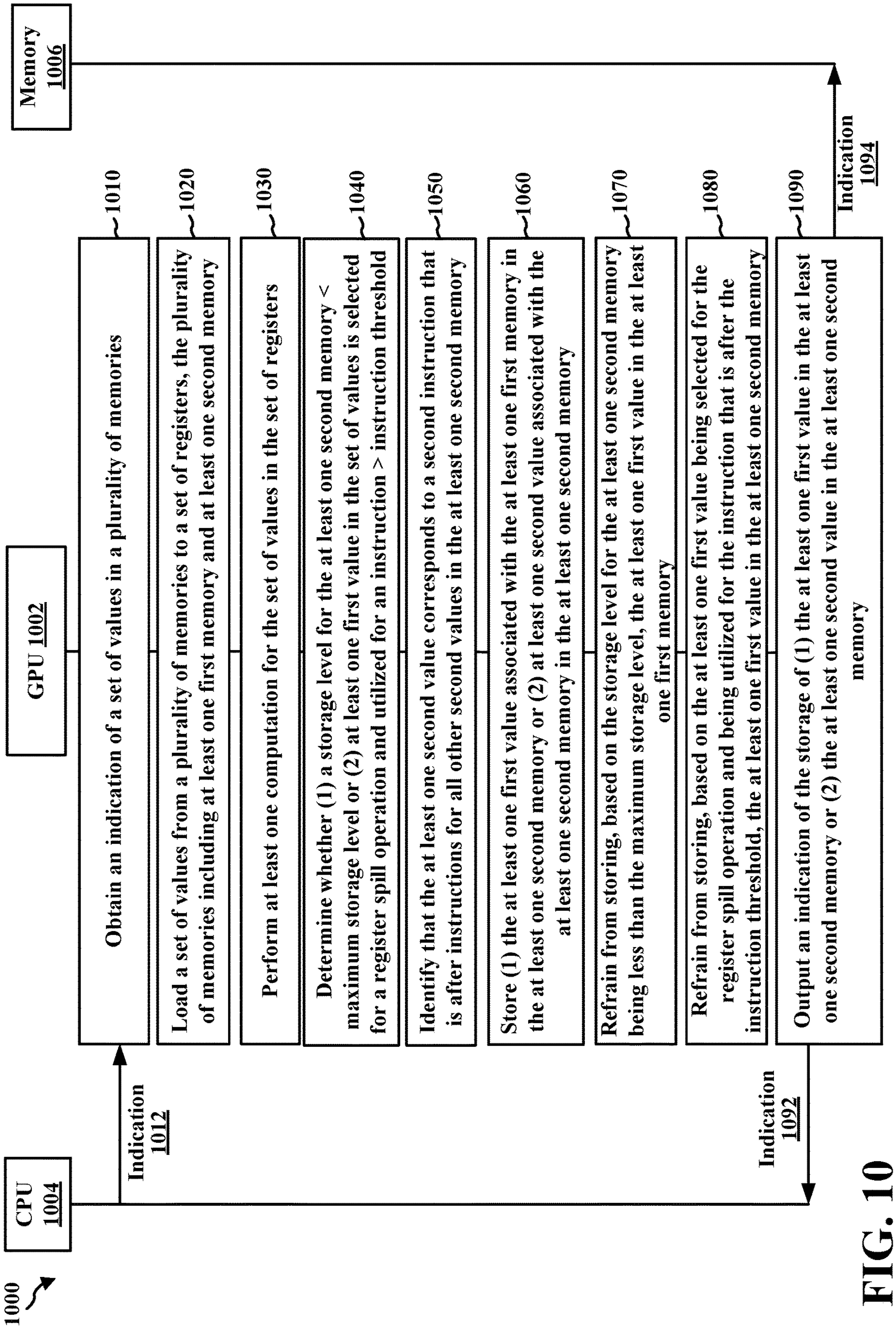
FIG. 10 is a communication flow diagram illustrating example communications between a GPU, a CPU, and a memory.

FIG. 10 is a communication flow diagram 1000 of graphics processing in accordance with one or more techniques of this disclosure. As shown in FIG. 10, diagram 1000 includes example communications between GPU 1002 (e.g., a GPU, a GPU component, another graphics processor, a CPU, a CPU component, or another central processor), CPU 1004 (e.g., a CPU, a CPU component, another central processor, a GPU, a GPU component, or another graphics processor), and memory 1006 (e.g., a system memory, a graphics memory, or a memory or cache at a GPU), in accordance with one or more techniques of this disclosure.

At 1010, GPU 1002 may obtain an indication of a set of values in a plurality of memories, where a load of the set of values from the plurality of memories to a set of registers is based on the obtainment of the indication of the set of values in the plurality of memories (e.g., GPU 1002 may obtain indication 1012 from CPU 1004).

At 1020, GPU 1002 may load a set of values from a plurality of memories to a set of registers, where the plurality of memories includes at least one first memory and at least one second memory, where each of the set of values is associated with the at least one first memory or the at least one second memory. In some aspects, each of the set of values may be associated with the at least one first memory if a memory source for the value is the at least one first memory, and each of the set of values may be associated with the at least one second memory if the memory source for the value is the at least one second memory. The set of registers may be a set of general purpose registers at a graphics processing unit (GPU) or a central processing unit (CPU). The instruction may be a shader processor (SP) instruction in the GPU, and the set of values may include at least one of: a set of integer values or a set of floating point values. Also, the at least one first memory may include at least one global memory, and the at least one second memory may include at least one local memory. The at least one global memory may be backed up by multiple levels of caches, such that the at least one global memory may include at least one of: a first level cache (L1 cache), a second level cache (L2 cache), a last level cache (LLC), or a dynamic random access memory (DRAM).

At 1030, GPU 1002 may perform at least one computation for the set of values in the set of registers, where the at least one computation includes at least one of: an arithmetic operation, a comparison operation, a logical operation (e.g., AND, OR, XOR, etc.), and where a determination is based on the performance of the at least one computation.

At 1040, GPU 1002 may determine whether (1) a storage level for the at least one second memory is less than a maximum storage level, or (2) at least one first value in the set of values is selected for a register spill operation and will be utilized for an instruction that is after an instruction threshold, where the at least one first value is associated with the at least one first memory. In some aspects, the instruction threshold may be associated with a set of unique instructions that access a set of unique memory values including a memory size that exceeds a sum of a size of all cache levels in the at least one first memory. The set of unique memory values including the memory size that exceeds the sum of the size of all cache levels in the at least one first memory may cause the at least one first value to be written back to a dynamic random access memory (DRAM) in the at least one first memory. In some aspects, the instruction threshold may be associated with a set of unique instructions that access a same cache set as the at least one first value for different levels of caches in the at least one first memory. Also, the set of unique instructions that access the same cache set as the at least one first value for the different levels of caches in the at least one first memory may cause the at least one first value to be written back to a dynamic random access memory (DRAM) in the at least one first memory. Additionally, the storage level for the at least one second memory may be at the maximum storage level if the at least one first value is selected for the register spill operation and is utilized for the instruction that is after the instruction threshold. Further, the determination may occur (or be configured to occur) at a register spill time for the register spill operation, where the register spill operation is an operation associated with a movement of a value from a first memory location to a second memory location based on a first storage level for the first memory location reaching a maximum first storage level, where the register spill time is a time corresponding to the movement of the value from the first memory location to the second memory location.

At 1050, GPU 1002 may identify that the at least one second value corresponds to a second instruction that is after instructions for all other second values in the at least one second memory.

At 1060, GPU 1002 may store (1) the at least one first value in the at least one second memory based on the storage level for the at least one second memory being less than the maximum storage level, or (2) at least one second value in the set of values in the at least one second memory based on the at least one first value being selected for the register spill operation and being utilized for the instruction that is after the instruction threshold, where the at least one second value is associated with the at least one second memory.

At 1070, GPU 1002 may refrain from storing, based on the storage level for the at least one second memory being less than the maximum storage level, the at least one first value in the at least one first memory.

At 1080, GPU 1002 may refrain from storing, based on the at least one first value being selected for the register spill operation and being utilized for the instruction that is after the instruction threshold, the at least one first value in the at least one second memory.

At 1090, GPU 1002 may output an indication of the storage of (1) the at least one first value in the at least one second memory or (2) the at least one second value in the at least one second memory. In some aspects, outputting the indication of the storage of (1) the at least one first value in the at least one second memory or (2) the at least one second value in the at least one second memory may comprise transmitting the indication of the storage of (1) the at least one first value in the at least one second memory or (2) the at least one second value in the at least one second memory (e.g., GPU 1002 may transmit indication 1092 to CPU 1004). Also, outputting the indication of the storage of (1) the at least one first value in the at least one second memory or (2) the at least one second value in the at least one second memory may comprise storing the indication of the storage of (1) the at least one first value in the at least one second memory or (2) the at least one second value in the at least one second memory (e.g., GPU 1002 may store indication 1094 in memory 1006).

Figure 11:
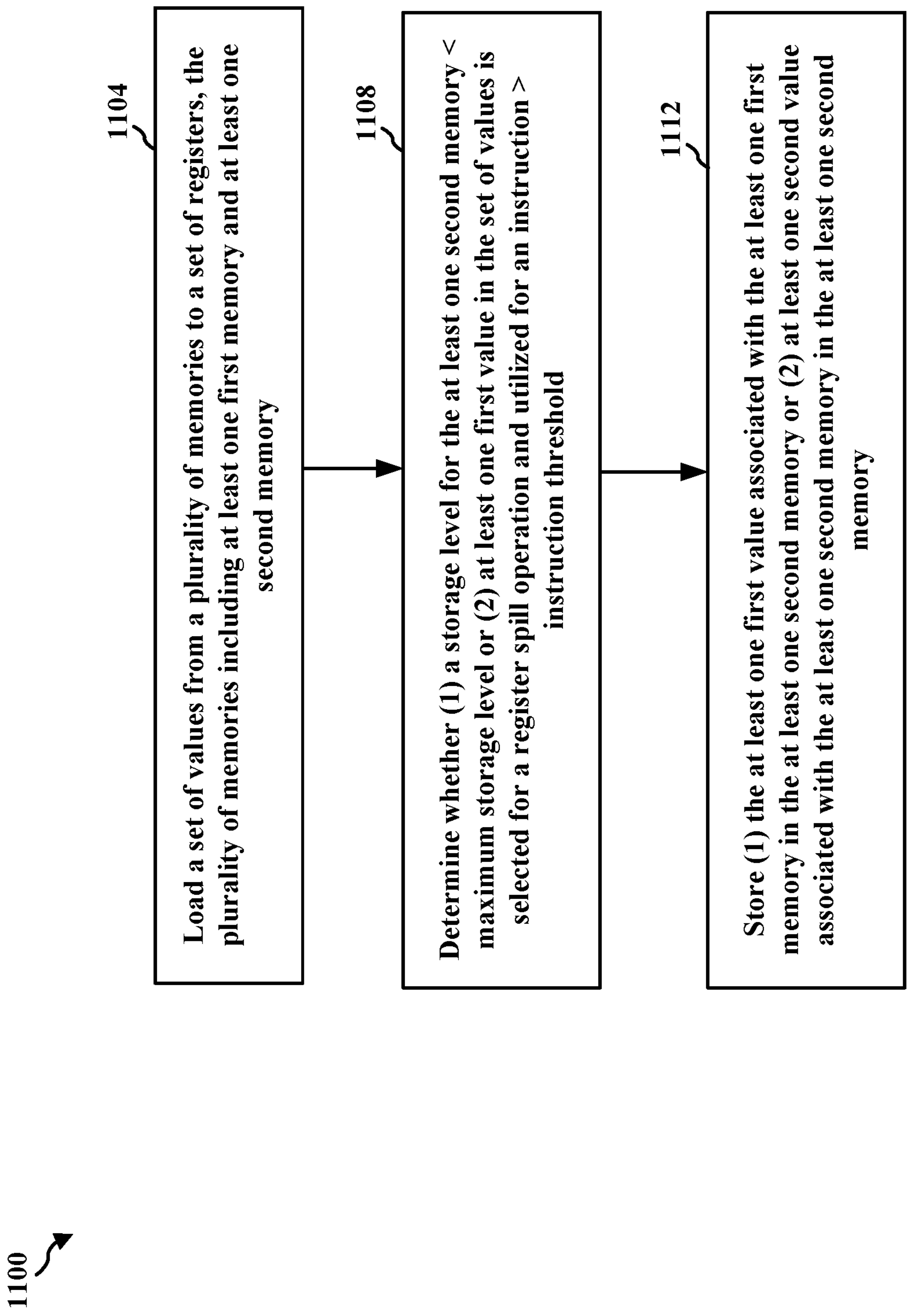
FIG. 11 is a flowchart of an example method of graphics processing.

FIG. 11 is a flowchart 1100 of an example method of display processing in accordance with one or more techniques of this disclosure. The method may be performed by a GPU (e.g., a GPU, a GPU component, another graphics processor, a CPU, a CPU component, or another central processor), a CPU (a CPU, a CPU component, another central processor, a GPU, a GPU component, or another graphics processor), a display driver integrated circuit (DDIC), an apparatus for graphics processing, a wireless communication device, and/or any apparatus that may perform graphics processing as used in connection with the examples of FIGS. 1-10.

At 1104, the GPU may load a set of values from a plurality of memories to a set of registers, where the plurality of memories includes at least one first memory and at least one second memory, where each of the set of values is associated with the at least one first memory or the at least one second memory, as described in connection with the examples in FIGS. 1-10. For example, as described in 1020 of FIG. 10, GPU 1002 may load a set of values from a plurality of memories to a set of registers, where the plurality of memories includes at least one first memory and at least one second memory, where each of the set of values is associated with the at least one first memory or the at least one second memory. Further, step 1104 may be performed by processing unit 120 in FIG. 1. In some aspects, each of the set of values may be associated with the at least one first memory if a memory source for the value is the at least one first memory, and each of the set of values may be associated with the at least one second memory if the memory source for the value is the at least one second memory. The set of registers may be a set of general purpose registers at a graphics processing unit (GPU) or a central processing unit (CPU). The instruction may be a shader processor (SP) instruction in the GPU, and the set of values may include at least one of: a set of integer values or a set of floating point values. Also, the at least one first memory may include at least one global memory, and the at least one second memory may include at least one local memory. The at least one global memory may be backed up by multiple levels of caches, such that the at least one global memory may include at least one of: a first level cache (L1 cache), a second level cache (L2 cache), a last level cache (LLC), or a dynamic random access memory (DRAM).

At 1108, the GPU may determine whether (1) a storage level for the at least one second memory is less than a maximum storage level, or (2) at least one first value in the set of values is selected for a register spill operation and will be utilized for an instruction that is after an instruction threshold, where the at least one first value is associated with the at least one first memory, as described in connection with the examples in FIGS. 1-10. For example, as described in 1040 of FIG. 10, GPU 1002 may determine whether (1) a storage level for the at least one second memory is less than a maximum storage level, or (2) at least one first value in the set of values is selected for a register spill operation and will be utilized for an instruction that is after an instruction threshold, where the at least one first value is associated with the at least one first memory. Further, step 1108 may be performed by processing unit 120 in FIG. 1. In some aspects, the instruction threshold may be associated with a set of unique instructions that access a set of unique memory values including a memory size that exceeds a sum of a size of all cache levels in the at least one first memory. The set of unique memory values including the memory size that exceeds the sum of the size of all cache levels in the at least one first memory may cause the at least one first value to be written back to a dynamic random access memory (DRAM) in the at least one first memory. In some aspects, the instruction threshold may be associated with a set of unique instructions that access a same cache set as the at least one first value for different levels of caches in the at least one first memory. Also, the set of unique instructions that access the same cache set as the at least one first value for the different levels of caches in the at least one first memory may cause the at least one first value to be written back to a dynamic random access memory (DRAM) in the at least one first memory. Additionally, the storage level for the at least one second memory may be at the maximum storage level if the at least one first value is selected for the register spill operation and is utilized for the instruction that is after the instruction threshold. Further, the determination may occur (or be configured to occur) at a register spill time for the register spill operation, where the register spill operation is an operation associated with a movement of a value from a first memory location to a second memory location based on a first storage level for the first memory location reaching a maximum first storage level, where the register spill time is a time corresponding to the movement of the value from the first memory location to the second memory location.

At 1112, the GPU may store (1) the at least one first value in the at least one second memory based on the storage level for the at least one second memory being less than the maximum storage level, or (2) at least one second value in the set of values in the at least one second memory based on the at least one first value being selected for the register spill operation and being utilized for the instruction that is after the instruction threshold, where the at least one second value is associated with the at least one second memory, as described in connection with the examples in FIGS. 1-10. For example, as described in 1060 of FIG. 10, GPU 1002 may store (1) the at least one first value in the at least one second memory based on the storage level for the at least one second memory being less than the maximum storage level, or (2) at least one second value in the set of values in the at least one second memory based on the at least one first value being selected for the register spill operation and being utilized for the instruction that is after the instruction threshold, where the at least one second value is associated with the at least one second memory. Further, step 1112 may be performed by processing unit 120 in FIG. 1.

Figure 12:
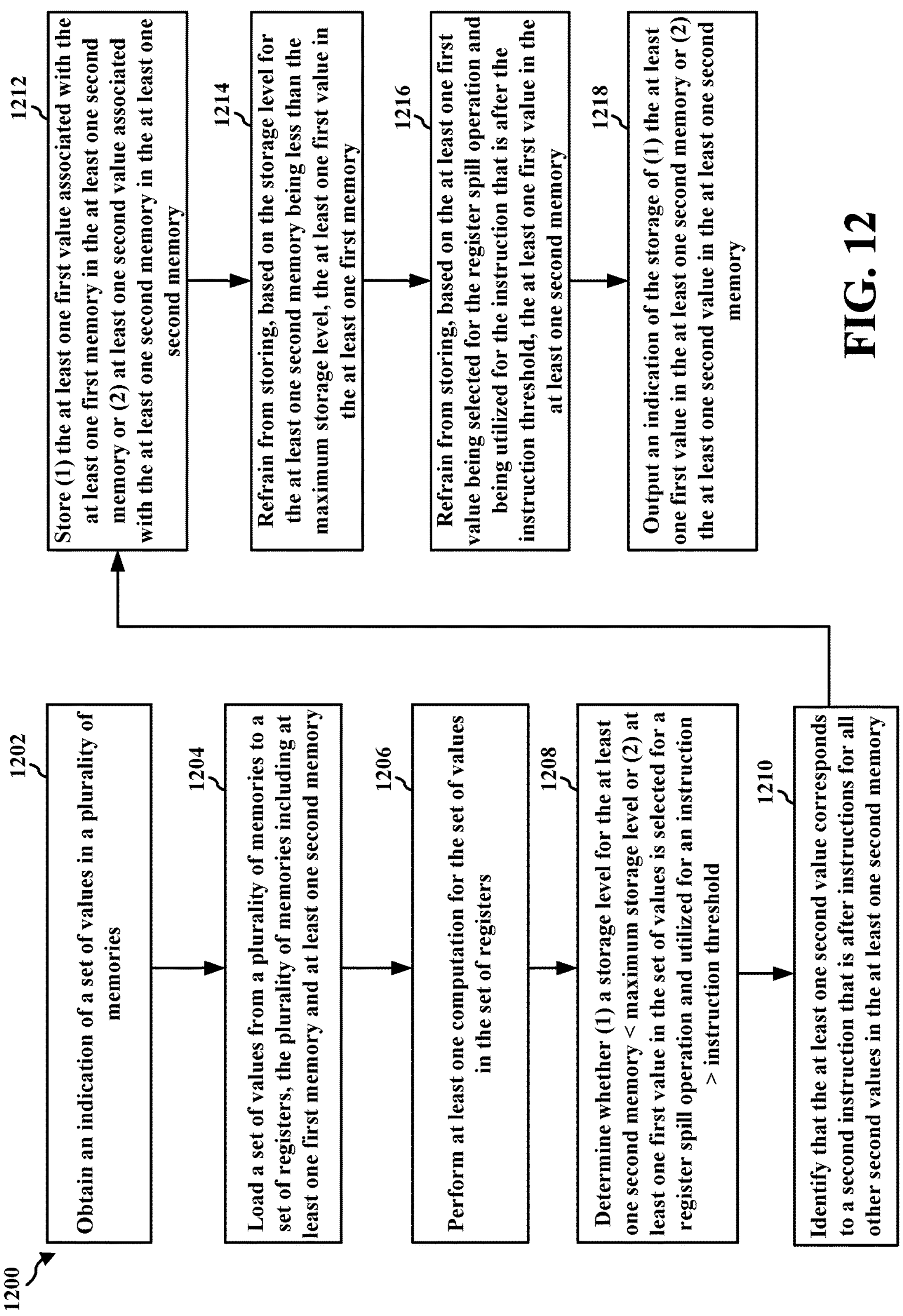
FIG. 12 is a flowchart of an example method of graphics processing.

FIG. 12 is a flowchart 1200 of an example method of display processing in accordance with one or more techniques of this disclosure. The method may be performed by a GPU (e.g., a GPU, a GPU component, another graphics processor, a CPU, a CPU component, or another central processor), a CPU (a CPU, a CPU component, another central processor, a GPU, a GPU component, or another graphics processor), a display driver integrated circuit (DDIC), an apparatus for graphics processing, a wireless communication device, and/or any apparatus that may perform graphics processing as used in connection with the examples of FIGS. 1-10.

At 1202, the GPU may obtain an indication of a set of values in a plurality of memories, where a load of the set of values from the plurality of memories to a set of registers is based on the obtainment of the indication of the set of values in the plurality of memories, as described in connection with the examples in FIGS. 1-10. For example, as described in 1010 of FIG. 10, GPU 1002 may obtain an indication of a set of values in a plurality of memories, where a load of the set of values from the plurality of memories to a set of registers is based on the obtainment of the indication of the set of values in the plurality of memories. Further, step 1202 may be performed by processing unit 120 in FIG. 1.

At 1204, the GPU may load a set of values from a plurality of memories to a set of registers, where the plurality of memories includes at least one first memory and at least one second memory, where each of the set of values is associated with the at least one first memory or the at least one second memory, as described in connection with the examples in FIGS. 1-10. For example, as described in 1020 of FIG. 10, GPU 1002 may load a set of values from a plurality of memories to a set of registers, where the plurality of memories includes at least one first memory and at least one second memory, where each of the set of values is associated with the at least one first memory or the at least one second memory. Further, step 1204 may be performed by processing unit 120 in FIG. 1. In some aspects, each of the set of values may be associated with the at least one first memory if a memory source for the value is the at least one first memory, and each of the set of values may be associated with the at least one second memory if the memory source for the value is the at least one second memory. The set of registers may be a set of general purpose registers at a graphics processing unit (GPU) or a central processing unit (CPU). The instruction may be a shader processor (SP) instruction in the GPU, and the set of values may include at least one of: a set of integer values or a set of floating point values. Also, the at least one first memory may include at least one global memory, and the at least one second memory may include at least one local memory. The at least one global memory may be backed up by multiple levels of caches, such that the at least one global memory may include at least one of: a first level cache (L1 cache), a second level cache (L2 cache), a last level cache (LLC), or a dynamic random access memory (DRAM).

At 1206, the GPU may perform at least one computation for the set of values in the set of registers, where the at least one computation includes at least one of: an arithmetic operation, a comparison operation, a logical operation (e.g., AND, OR, XOR, etc.), and where a determination is based on the performance of the at least one computation, as described in connection with the examples in FIGS. 1-10. For example, as described in 1030 of FIG. 10, GPU 1002 may perform at least one computation for the set of values in the set of registers, where the at least one computation includes at least one of: an arithmetic operation, a comparison operation, a logical operation (e.g., AND, OR, XOR, etc.), and where a determination is based on the performance of the at least one computation. Further, step 1206 may be performed by processing unit 120 in FIG. 1.

At 1208, the GPU may determine whether (1) a storage level for the at least one second memory is less than a maximum storage level, or (2) at least one first value in the set of values is selected for a register spill operation and will be utilized for an instruction that is after an instruction threshold, where the at least one first value is associated with the at least one first memory, as described in connection with the examples in FIGS. 1-10. For example, as described in 1040 of FIG. 10, GPU 1002 may determine whether (1) a storage level for the at least one second memory is less than a maximum storage level, or (2) at least one first value in the set of values is selected for a register spill operation and will be utilized for an instruction that is after an instruction threshold, where the at least one first value is associated with the at least one first memory. Further, step 1208 may be performed by processing unit 120 in FIG. 1. In some aspects, the instruction threshold may be associated with a set of unique instructions that access a set of unique memory values including a memory size that exceeds a sum of a size of all cache levels in the at least one first memory. The set of unique memory values including the memory size that exceeds the sum of the size of all cache levels in the at least one first memory may cause the at least one first value to be written back to a dynamic random access memory (DRAM) in the at least one first memory. In some aspects, the instruction threshold may be associated with a set of unique instructions that access a same cache set as the at least one first value for different levels of caches in the at least one first memory. Also, the set of unique instructions that access the same cache set as the at least one first value for the different levels of caches in the at least one first memory may cause the at least one first value to be written back to a dynamic random access memory (DRAM) in the at least one first memory. Additionally, the storage level for the at least one second memory may be at the maximum storage level if the at least one first value is selected for the register spill operation and is utilized for the instruction that is after the instruction threshold. Further, the determination may occur (or be configured to occur) at a register spill time for the register spill operation, where the register spill operation is an operation associated with a movement of a value from a first memory location to a second memory location based on a first storage level for the first memory location reaching a maximum first storage level, where the register spill time is a time corresponding to the movement of the value from the first memory location to the second memory location.

At 1210, the GPU may identify that the at least one second value corresponds to a second instruction that is after instructions for all other second values in the at least one second memory, as described in connection with the examples in FIGS. 1-10. For example, as described in 1050 of FIG. 10, GPU 1002 may identify that the at least one second value corresponds to a second instruction that is after instructions for all other second values in the at least one second memory. Further, step 1210 may be performed by processing unit 120 in FIG. 1.

At 1212, the GPU may store (1) the at least one first value in the at least one second memory based on the storage level for the at least one second memory being less than the maximum storage level, or (2) at least one second value in the set of values in the at least one second memory based on the at least one first value being selected for the register spill operation and being utilized for the instruction that is after the instruction threshold, where the at least one second value is associated with the at least one second memory, as described in connection with the examples in FIGS. 1-10. For example, as described in 1060 of FIG. 10, GPU 1002 may store (1) the at least one first value in the at least one second memory based on the storage level for the at least one second memory being less than the maximum storage level, or (2) at least one second value in the set of values in the at least one second memory based on the at least one first value being selected for the register spill operation and being utilized for the instruction that is after the instruction threshold, where the at least one second value is associated with the at least one second memory. Further, step 1212 may be performed by processing unit 120 in FIG. 1.

At 1214, the GPU may refrain from storing, based on the storage level for the at least one second memory being less than the maximum storage level, the at least one first value in the at least one first memory, as described in connection with the examples in FIGS. 1-10. For example, as described in 1070 of FIG. 10, GPU 1002 may refrain from storing, based on the storage level for the at least one second memory being less than the maximum storage level, the at least one first value in the at least one first memory. Further, step 1214 may be performed by processing unit 120 in FIG. 1.

At 1216, the GPU may refrain from storing, based on the at least one first value being selected for the register spill operation and being utilized for the instruction that is after the instruction threshold, the at least one first value in the at least one second memory, as described in connection with the examples in FIGS. 1-10. For example, as described in 1080 of FIG. 10, GPU 1002 may refrain from storing, based on the at least one first value being selected for the register spill operation and being utilized for the instruction that is after the instruction threshold, the at least one first value in the at least one second memory. Further, step 1216 may be performed by processing unit 120 in FIG. 1.

At 1218, the GPU may output an indication of the storage of (1) the at least one first value in the at least one second memory or (2) the at least one second value in the at least one second memory, as described in connection with the examples in FIGS. 1-10. For example, as described in 1090 of FIG. 10, GPU 1002 may output an indication of the storage of (1) the at least one first value in the at least one second memory or (2) the at least one second value in the at least one second memory. Further, step 1218 may be performed by processing unit 120 in FIG. 1. In some aspects, outputting the indication of the storage of (1) the at least one first value in the at least one second memory or (2) the at least one second value in the at least one second memory may comprise transmitting the indication of the storage of (1) the at least one first value in the at least one second memory or (2) the at least one second value in the at least one second memory. Also, outputting the indication of the storage of (1) the at least one first value in the at least one second memory or (2) the at least one second value in the at least one second memory may comprise storing the indication of the storage of (1) the at least one first value in the at least one second memory or (2) the at least one second value in the at least one second memory.

In configurations, a method or an apparatus for display processing is provided. The apparatus may be a GPU (or other graphics processor), a CPU (or other central processor), a DDIC, an apparatus for graphics processing, and/or some other processor that may perform graphics processing. In aspects, the apparatus may be the processing unit 120 within the device 104, or may be some other hardware within the device 104 or another device. The apparatus, e.g., processing unit 120, may include means for loading a set of values from a plurality of memories to a set of registers, wherein the plurality of memories includes at least one first memory and at least one second memory, wherein each of the set of values is associated with the at least one first memory or the at least one second memory. The apparatus, e.g., processing unit 120, may also include means for determining whether (1) at least one first value in the set of values is selected for a register spill operation and will be utilized for an instruction that is after an instruction threshold, wherein the at least one first value is associated with the at least one first memory, or (2) a storage level for the at least one second memory is less than a maximum storage level. The apparatus, e.g., processing unit 120, may also include means for storing (1) at least one second value in the set of values in the at least one second memory based on the at least one first value being selected for the register spill operation and being utilized for the instruction that is after the instruction threshold, wherein the at least one second value is associated with the at least one second memory, or (2) the at least one first value in the at least one second memory based on the storage level for the at least one second memory being less than the maximum storage level. The apparatus, e.g., processing unit 120, may also include means for refraining from storing, based on the at least one first value being selected for the register spill operation and being utilized for the instruction that is after the instruction threshold, the at least one first value in the at least one second memory. The apparatus, e.g., processing unit 120, may also include means for identifying that the at least one second value corresponds to a second instruction that is after instructions for all other second values in the at least one second memory. The apparatus, e.g., processing unit 120, may also include means for refraining from storing, based on the storage level for the at least one second memory being less than the maximum storage level, the at least one first value in the at least one first memory. The apparatus, e.g., processing unit 120, may also include means for performing at least one computation for the set of values in the set of registers, wherein the at least one computation includes at least one of: an arithmetic operation, a comparison operation, a logical operation, and wherein the determination is based on the performance of the at least one computation.

The apparatus, e.g., processing unit 120, may also include means for obtaining an indication of the set of values in the plurality of memories, wherein the load of the set of values from the plurality of memories to the set of registers is based on the obtainment of the indication of the set of values in the plurality of memories. The apparatus, e.g., processing unit 120, may also include means for outputting an indication of the storage of (1) the at least one second value in the at least one second memory or (2) the at least one first value in the at least one second memory.

The subject matter described herein may be implemented to realize one or more benefits or advantages. For instance, the described graphics processing techniques may be used by a GPU, a CPU, a central processor, or some other processor that may perform graphics processing to implement the register allocation techniques described herein. This may also be accomplished at a low cost compared to other graphics processing techniques. Moreover, the graphics processing techniques herein may improve or speed up data processing or execution. Further, the graphics processing techniques herein may improve resource or data utilization and/or resource efficiency. Additionally, aspects of the present disclosure may utilize register allocation techniques in order to improve memory bandwidth efficiency and/or increase processing speed at a GPU, a CPU, or a DPU.

It is understood that the specific order or hierarchy of blocks in the processes/flowcharts disclosed is an illustration of example approaches. Based upon design preferences, it is understood that the specific order or hierarchy of blocks in the processes/flowcharts may be rearranged. Further, some blocks may be combined or omitted. The accompanying method claims present elements of the various blocks in a sample order, and are not meant to be limited to the specific order or hierarchy presented.

The previous description is provided to enable any person skilled in the art to practice the various aspects described herein. Various modifications to these aspects will be readily apparent to those skilled in the art, and the generic principles defined herein may be applied to other aspects. Thus, the claims are not intended to be limited to the aspects shown herein, but is to be accorded the full scope consistent with the language of the claims, wherein reference to an element in the singular is not intended to mean "one and only one" unless specifically so stated, but rather "one or more." The word "exemplary" is used herein to mean "serving as an example, instance, or illustration." Any aspect described herein as "exemplary" is not necessarily to be construed as preferred or advantageous over other aspects.

Unless specifically stated otherwise, the term "some" refers to one or more and the term "or" may be interpreted as "and/or" where context does not dictate otherwise. Combinations such as "at least one of A, B, or C," "one or more of A, B, or C," "at least one of A, B, and C," "one or more of A, B, and C," and "A, B, C, or any combination thereof" include any combination of A, B, and/or C, and may include multiples of A, multiples of B, or multiples of C. Specifically, combinations such as "at least one of A, B, or C," "one or more of A, B, or C," "at least one of A, B, and C," "one or more of A, B, and C," and "A, B, C, or any combination thereof" may be A only, B only, C only, A and B, A and C, B and C, or A and B and C, where any such combinations may contain one or more member or members of A, B, or C. All structural and functional equivalents to the elements of the various aspects described throughout this disclosure that are known or later come to be known to those of ordinary skill in the art are expressly incorporated herein by reference and are intended to be encompassed by the claims. Moreover, nothing disclosed herein is intended to be dedicated to the public regardless of whether such disclosure is explicitly recited in the claims. The words "module," "mechanism," "element," "device," and the like may not be a substitute for the word "means." As such, no claim element is to be construed as a means plus function unless the element is expressly recited using the phrase "means for."

In one or more examples, the functions described herein may be implemented in hardware, software, firmware, or any combination thereof. For example, although the term "processing unit" has been used throughout this disclosure, such processing units may be implemented in hardware, software, firmware, or any combination thereof. If any function, processing unit, technique described herein, or other module is implemented in software, the function, processing unit, technique described herein, or other module may be stored on or transmitted over as one or more instructions or code on a computer-readable medium.

In accordance with this disclosure, the term "or" may be interpreted as "and/or" where context does not dictate otherwise. Additionally, while phrases such as "one or more" or "at least one" or the like may have been used for some features disclosed herein but not others, the features for which such language was not used may be interpreted to have such a meaning implied where context does not dictate otherwise.

In one or more examples, the functions described herein may be implemented in hardware, software, firmware, or any combination thereof. For example, although the term "processing unit" has been used throughout this disclosure, such processing units may be implemented in hardware, software, firmware, or any combination thereof. If any function, processing unit, technique described herein, or other module is implemented in software, the function, processing unit, technique described herein, or other module may be stored on or transmitted over as one or more instructions or code on a computer-readable medium. Computer-readable media may include computer data storage media or communication media including any medium that facilitates transfer of a computer program from one place to another. In this manner, computer-readable media generally may correspond to (1) tangible computer-readable storage media, which is non-transitory or (2) a communication medium such as a signal or carrier wave. Data storage media may be any available media that may be accessed by one or more computers or one or more processors to retrieve instructions, code and/or data structures for implementation of the techniques described in this disclosure. By way of example, and not limitation, such computer-readable media may comprise RAM, ROM, EEPROM, CD-ROM or other optical disk storage, magnetic disk storage or other magnetic storage devices. Disk and disc, as used herein, includes compact disc (CD), laser disc, optical disc, digital versatile disc (DVD), floppy disk and Blu-ray disc where disks usually reproduce data magnetically, while discs reproduce data optically with lasers. Combinations of the above should also be included within the scope of computer-readable media. A computer program product may include a computer-readable medium.

The code may be executed by one or more processors, such as one or more digital signal processors (DSPs), general purpose microprocessors, application specific integrated circuits (ASICs), arithmetic logic units (ALUs), field programmable logic arrays (FPGAs), or other equivalent integrated or discrete logic circuitry. Accordingly, the term "processor," as used herein may refer to any of the foregoing structure or any other structure suitable for implementation of the techniques described herein. Also, the techniques could be fully implemented in one or more circuits or logic elements.

The techniques of this disclosure may be implemented in a wide variety of devices or apparatuses, including a wireless handset, an integrated circuit (IC) or a set of ICs, e.g., a chip set. Various components, modules or units are described in this disclosure to emphasize functional aspects of devices configured to perform the disclosed techniques, but do not necessarily need realization by different hardware units. Rather, as described above, various units may be combined in any hardware unit or provided by a collection of inter-operative hardware units, including one or more processors as described above, in conjunction with suitable software and/or firmware. Accordingly, the term "processor," as used herein may refer to any of the foregoing structure or any other structure suitable for implementation of the techniques described herein. Also, the techniques may be fully implemented in one or more circuits or logic elements.

The following aspects are illustrative only and may be combined with other aspects or teachings described herein, without limitation.

Aspect 1 is an apparatus for graphics processing, including at least one memory and at least one processor coupled to the at least one memory and, based at least in part on information stored in the at least one memory, the at least one processor, individually or in any combination, is configured to: load a set of values from a plurality of memories to a set of registers, wherein the plurality of memories includes at least one first memory and at least one second memory, wherein each of the set of values is associated with the at least one first memory or the at least one second memory; determine whether (1) a storage level for the at least one second memory is less than a maximum storage level, or (2) at least one first value in the set of values is selected for a register spill operation and will be utilized for an instruction that is after an instruction threshold, wherein the at least one first value is associated with the at least one first memory; and store (1) the at least one first value in the at least one second memory based on the storage level for the at least one second memory being less than the maximum storage level, or (2) at least one second value in the set of values in the at least one second memory based on the at least one first value being selected for the register spill operation and being utilized for the instruction that is after the instruction threshold, wherein the at least one second value is associated with the at least one second memory.

Aspect 2 is the apparatus of aspect 1, wherein the at least one processor, individually or in any combination, is further configured to: refrain from storing, based on the at least one first value being selected for the register spill operation and being utilized for the instruction that is after the instruction threshold, the at least one first value in the at least one second memory.

Aspect 3 is the apparatus of any of aspects 1 to 2, wherein the instruction threshold is associated with a set of unique instructions that access a set of unique memory values including a memory size that exceeds a sum of a size of all cache levels in the at least one first memory.

Aspect 4 is the apparatus of aspect 3, wherein the set of unique memory values including the memory size that exceeds the sum of the size of all cache levels in the at least one first memory causes the at least one first value to be written back to a dynamic random access memory (DRAM) in the at least one first memory.

Aspect 5 is the apparatus of any of aspects 1 to 4, wherein the instruction threshold is associated with a set of unique instructions that access a same cache set as the at least one first value for different levels of caches in the at least one first memory.

Aspect 6 is the apparatus of aspect 5, wherein the set of unique instructions that access the same cache set as the at least one first value for the different levels of caches in the at least one first memory causes the at least one first value to be written back to a dynamic random access memory (DRAM) in the at least one first memory.

Aspect 7 is the apparatus of any of aspects 1 to 6, wherein the storage level for the at least one second memory is at the maximum storage level if the at least one first value is selected for the register spill operation and is utilized for the instruction that is after the instruction threshold.

Aspect 8 is the apparatus of any of aspects 1 to 7, wherein the at least one processor, individually or in any combination, is further configured to: identify that the at least one second value corresponds to a second instruction that is after instructions for all other second values in the at least one second memory.

Aspect 9 is the apparatus of any of aspects 1 to 8, wherein the at least one processor, individually or in any combination, is further configured to: refrain from storing, based on the storage level for the at least one second memory being less than the maximum storage level, the at least one first value in the at least one first memory.

Aspect 10 is the apparatus of any of aspects 1 to 9, wherein the determination is configured to occur at a register spill time for the register spill operation, wherein the register spill operation is an operation associated with a movement of a value from a first memory location to a second memory location based on a first storage level for the first memory location reaching a maximum first storage level, and wherein the register spill time is a time corresponding to the movement of the value from the first memory location to the second memory location.

Aspect 11 is the apparatus of any of aspects 1 to 10, wherein the at least one processor, individually or in any combination, is further configured to: perform at least one computation for the set of values in the set of registers, wherein the at least one computation includes at least one of: an arithmetic operation, a comparison operation, a logical operation, and wherein the determination is based on the performance of the at least one computation.

Aspect 12 is the apparatus of any of aspects 1 to 11, wherein the at least one processor, individually or in any combination, is further configured to: obtain an indication of the set of values in the plurality of memories, wherein the load of the set of values from the plurality of memories to the set of registers is based on the obtainment of the indication of the set of values in the plurality of memories.

Aspect 13 is the apparatus of any of aspects 1 to 12, wherein each of the set of values is associated with the at least one first memory if a memory source for the value is the at least one first memory, and wherein each of the set of values is associated with the at least one second memory if the memory source for the value is the at least one second memory.

Aspect 14 is the apparatus of any of aspects 1 to 13, wherein the set of registers is a set of general purpose registers at a graphics processing unit (GPU) or a central processing unit (CPU).

Aspect 15 is the apparatus of aspect 14, wherein the instruction is a shader processor (SP) instruction in the GPU, and wherein the set of values includes at least one of: a set of integer values or a set of floating point values.

Aspect 16 is the apparatus of any of aspects 1 to 15, wherein the at least one first memory includes at least one global memory, and wherein the at least one second memory includes at least one local memory.

Aspect 17 is the apparatus of aspect 16, wherein the at least one global memory is backed up by multiple levels of caches, such that the at least one global memory includes at least one of: a first level cache (L1 cache), a second level cache (L2 cache), a last level cache (LLC), or a dynamic random access memory (DRAM).

Aspect 18 is the apparatus of any of aspects 1 to 17, wherein the at least one processor, individually or in any combination, is further configured to: output an indication of the storage of (1) the at least one first value in the at least one second memory or (2) the at least one second value in the at least one second memory.

Aspect 19 is the apparatus of aspect 18, wherein to output the indication of the storage of (1) the at least one first value in the at least one second memory or (2) the at least one second value in the at least one second memory, the at least one processor, individually or in any combination, is configured to: transmit the indication of the storage of (1) the at least one first value in the at least one second memory or (2) the at least one second value in the at least one second memory; or store the indication of the storage of (1) the at least one first value in the at least one second memory or (2) the at least one second value in the at least one second memory.

Aspect 20 is the apparatus of aspect 19, wherein the apparatus is a wireless communication device further including (i.e., comprising): at least one of a transceiver or an antenna coupled to the at least one processor, wherein to transmit the indication, the at least one processor, individually or in any combination, is configured to: transmit the indication via at least one of the transceiver or the antenna.

Aspect 21 is a method of graphics processing for implementing any of aspects 1 to 20.

Aspect 22 is an apparatus for graphics processing including means for implementing any of aspects 1 to 20.

Aspect 23 is a computer-readable medium (e.g., a non-transitory computer-readable medium) storing computer executable code, the code when executed by at least one processor causes the at least one processor to implement any of aspects 1 to 20.

What is claimed is:

1. An apparatus for graphics processing, comprising:

at least one memory; and at least one processor coupled to the at least one memory and, based at least in part on information stored in the at least one memory, the at least one processor is configured to:

load a set of values from a plurality of memories to a set of registers, wherein the plurality of memories includes at least one first memory and at least one second memory, wherein each of the set of values is associated with the at least one first memory or the at least one second memory;

determine whether (1) a storage level for the at least one second memory is less than a maximum storage level, or (2) at least one first value in the set of values is selected for a register spill operation and will be utilized for an instruction that is after an instruction threshold, wherein the at least one first value is associated with the at least one first memory, wherein the instruction threshold is associated with a set of unique instructions that access a set of unique memory values including a memory size that exceeds a sum of a size of all cache levels in the at least one first memory; and store (1) the at least one first value in the at least one second memory based on the storage level for the at least one second memory being less than the maximum storage level, or (2) at least one second value in the set of values in the at least one second memory based on the at least one first value being selected for the register spill operation and being utilized for the instruction that is after the instruction threshold, wherein the at least one second value is associated with the at least one second memory.

2. The apparatus of claim 1, wherein the at least one processor is further configured to:

refrain from storing, based on the at least one first value being selected for the register spill operation and being utilized for the instruction that is after the instruction threshold, the at least one first value in the at least one second memory.

3. The apparatus of claim 1, wherein the set of unique memory values including the memory size that exceeds the sum of the size of all cache levels in the at least one first memory causes the at least one first value to be written back to a dynamic random access memory (DRAM) in the at least one first memory.

4. The apparatus of claim 1, wherein the instruction threshold is associated with a set of unique instructions that access a same cache set as the at least one first value for different levels of caches in the at least one first memory.

5. The apparatus of claim 4, wherein the set of unique instructions that access the same cache set as the at least one first value for the different levels of caches in the at least one first memory causes the at least one first value to be written back to a dynamic random access memory (DRAM) in the at least one first memory.

6. The apparatus of claim 1, wherein the storage level for the at least one second memory is at the maximum storage level if the at least one first value is selected for the register spill operation and is utilized for the instruction that is after the instruction threshold.

7. The apparatus of claim 1, wherein the at least one processor is further configured to:

identify that the at least one second value corresponds to a second instruction that is after instructions for all other second values in the at least one second memory.

8. The apparatus of claim 1, wherein the at least one processor is further configured to:

refrain from storing, based on the storage level for the at least one second memory being less than the maximum storage level, the at least one first value in the at least one first memory.

9. The apparatus of claim 1, wherein the determination is configured to occur at a register spill time for the register spill operation, wherein the register spill operation is an operation associated with a movement of a value from a first memory location to a second memory location based on a first storage level for the first memory location reaching a maximum first storage level, and wherein the register spill time is a time corresponding to the movement of the value from the first memory location to the second memory location.

10. The apparatus of claim 1, wherein the at least one processor is further configured to:

perform at least one computation for the set of values in the set of registers, wherein the at least one computation includes at least one of: an arithmetic operation, a comparison operation, a logical operation, and wherein the determination is based on the performance of the at least one computation.

11. The apparatus of claim 1, wherein the at least one processor is further configured to:

obtain an indication of the set of values in the plurality of memories, wherein the load of the set of values from the plurality of memories to the set of registers is based on the obtainment of the indication of the set of values in the plurality of memories.

12. The apparatus of claim 1, wherein each of the set of values is associated with the at least one first memory if a memory source for the value is the at least one first memory, and wherein each of the set of values is associated with the at least one second memory if the memory source for the value is the at least one second memory.

13. The apparatus of claim 1, wherein the set of registers is a set of general purpose registers at a graphics processing unit (GPU) or a central processing unit (CPU), wherein the instruction is a shader processor (SP) instruction in the GPU, and wherein the set of values includes at least one of: a set of integer values or a set of floating point values.

14. The apparatus of claim 1, wherein the at least one first memory includes at least one global memory, and wherein the at least one second memory includes at least one local memory.

15. The apparatus of claim 14, wherein the at least one global memory is backed up by multiple levels of caches, such that the at least one global memory includes at least one of: a first level cache (L1 cache), a second level cache (L2 cache), a last level cache (LLC), or a dynamic random access memory (DRAM).

16. The apparatus of claim 1, wherein the at least one processor is further configured to:

output an indication of the storage of (1) the at least one first value in the at least one second memory or (2) the at least one second value in the at least one second memory.

17. The apparatus of claim 16, wherein to output the indication of the storage of (1) the at least one first value in the at least one second memory or (2) the at least one second value in the at least one second memory, the at least one processor is configured to:

transmit the indication of the storage of (1) the at least one first value in the at least one second memory or (2) the at least one second value in the at least one second memory; or store the indication of the storage of (1) the at least one first value in the at least one second memory or (2) the at least one second value in the at least one second memory.

18. A method of graphics processing, comprising:

loading a set of values from a plurality of memories to a set of registers, wherein the plurality of memories includes at least one first memory and at least one second memory, wherein each of the set of values is associated with the at least one first memory or the at least one second memory;

determining whether (1) a storage level for the at least one second memory is less than a maximum storage level, or (2) at least one first value in the set of values is selected for a register spill operation and will be utilized for an instruction that is after an instruction threshold, wherein the at least one first value is associated with the at least one first memory, wherein the instruction threshold is associated with a set of unique instructions that access a set of unique memory values including a memory size that exceeds a sum of a size of all cache levels in the at least one first memory; and storing (1) the at least one first value in the at least one second memory based on the storage level for the at least one second memory being less than the maximum storage level, or (2) at least one second value in the set of values in the at least one second memory based on the at least one first value being selected for the register spill operation and being utilized for the instruction that is after the instruction threshold, wherein the at least one second value is associated with the at least one second memory.

19. A computer-readable medium storing computer executable code for graphics processing, the code when executed by at least one processor causes the at least one processor to:

load a set of values from a plurality of memories to a set of registers, wherein the plurality of memories includes at least one first memory and at least one second memory, wherein each of the set of values is associated with the at least one first memory or the at least one second memory;

determine whether (1) a storage level for the at least one second memory is less than a maximum storage level, or (2) at least one first value in the set of values is selected for a register spill operation and will be utilized for an instruction that is after an instruction threshold, wherein the at least one first value is associated with the at least one first memory, wherein the instruction threshold is associated with a set of unique instructions that access a set of unique memory values including a memory size that exceeds a sum of a size of all cache levels in the at least one first memory; and store (1) the at least one first value in the at least one second memory based on the storage level for the at least one second memory being less than the maximum storage level, or (2) at least one second value in the set of values in the at least one second memory based on the at least one first value being selected for the register spill operation and being utilized for the instruction that is after the instruction threshold, wherein the at least one second value is associated with the at least one second memory.

* * * * *